(12) United States Patent
Tsuzuki et al.

(10) Patent No.: US 7,412,435 B2
(45) Date of Patent: Aug. 12, 2008

(54) INFORMATION RETRIEVAL APPARATUS AND INFORMATION RETRIEVAL SUPPORT APPARATUS

(75) Inventors: Takashi Tsuzuki, Osaka (JP); Hiroshi Kutsumi, Moriguchi (JP); Yoshiyuki Okimoto, Soraku-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 401 days.

(21) Appl. No.: 11/064,121

(22) Filed: Feb. 23, 2005

(65) Prior Publication Data

US 2005/0149514 A1    Jul. 7, 2005

Related U.S. Application Data

(63) Continuation of application No. PCT/JP2004/019598, filed on Dec. 28, 2004.

(30) Foreign Application Priority Data

Jan. 6, 2004    (JP)    ............... 2004-000813

(51) Int. Cl.
*G06F 17/30* (2006.01)
*G06F 15/16* (2006.01)
(52) U.S. Cl. ............................ 707/2; 707/3
(58) Field of Classification Search ............ 707/2, 707/3; 705/14
See application file for complete search history.

(56) References Cited

U.S. PATENT DOCUMENTS 5,646,840 A * 7/1997 Yamauchi et al. .......... 704/2

7,181,438 B1 * 2/2007 Szabo ........................ 707/2

FOREIGN PATENT DOCUMENTS

| JP | 7-152771 | 6/1995 |
|---|---|---|
| JP | 9-282329 | 10/1997 |
| JP | 2000-222418 | 8/2000 |
| JP | 2000-224503 | 8/2000 |
| JP | 2001-256255 | 9/2001 |
| JP | 2001-312513 | 11/2001 |
| JP | 2002-142160 | 5/2002 |
| JP | 2002-269114 | 9/2002 |
| JP | 2002-269144 | 9/2002 |
| JP | 2002-358315 | 12/2002 |

* cited by examiner

*Primary Examiner*—Charles Rones
*Assistant Examiner*—Fariborz Khoshnoodi
(74) *Attorney, Agent, or Firm*—Wenderoth, Lind & Ponack, L.L.P.

(57) ABSTRACT

There is provided an information retrieval apparatus which can properly retrieve information associated with a user's preference from one of a plurality of data bases having different use frequencies. An information retrieval apparatus includes: a retrieval instruction issue unit which identifies one of an information source A data base, an information source B data base and an information source C data base according to the user's operation; a retrieval keyword selection unit which preferentially selects, from a group of keywords indicating the user's preference, one or more strongly preferred keywords based on a number associated with the use frequency of the data base identified by the retrieval instruction issue unit; and a retrieval unit which retrieves information including the one or more keywords selected by the retrieval keyword selection unit from the data base identified by the retrieval instruction issue unit.

36 Claims, 28 Drawing Sheets

FIG. 3

Keyword table 103a

| Keyword | Weight |
|---|---|
| Matsuue Electric | 90 |
| Economy | 80 |
| Sports | 70 |
| : | : |
| Entertainment | 20 |

FIG. 4

Threshold table 104a

| Data base identifier | Threshold |
|---|---|
| Information source A data base | 10 |
| Information source B data base | 80 |
| Information source C data base | 50 |

| Information source A data base | |
|---|---|
| Keyword | Weight |
| Matsuue Electric | 90 |
| Economy | 80 |
| Sports | 70 |
| .. | .. |
| Entertainment | 20 |

| Information source B data base | |
|---|---|
| Keyword | Weight |
| Matsuue Electric | 90 |
| Economy | 80 |
| Sports | 70 |
| .. | .. |
| Entertainment | 20 |

| Information source C data base | |
|---|---|
| Keyword | Weight |
| Matsuue Electric | 90 |
| Economy | 80 |
| Sports | 70 |
| .. | .. |
| Entertainment | 20 |

| Data base identifier | Threshold |
|---|---|
| Information source A data base | 10 |
| Information source B data base | 70 |
| Information source C data base | 50 |

Information source A data base

| Keyword | Weight |
|---|---|
| Matsuue Electric | 90 |
| Economy | 80 |
| Sports | 70 |
| .. | .. |
| Entertainment | 20 |

Information source B data base

| Keyword | Weight |
|---|---|
| Matsuue Electric | 90 |
| Economy | 80 |
| Sports | 70 |
| .. | .. |
| Entertainment | 20 |

Information source C data base

| Keyword | Weight |
|---|---|
| Matsuue Electric | 90 |
| Economy | 80 |
| Sports | 70 |
| .. | .. |
| Entertainment | 20 |

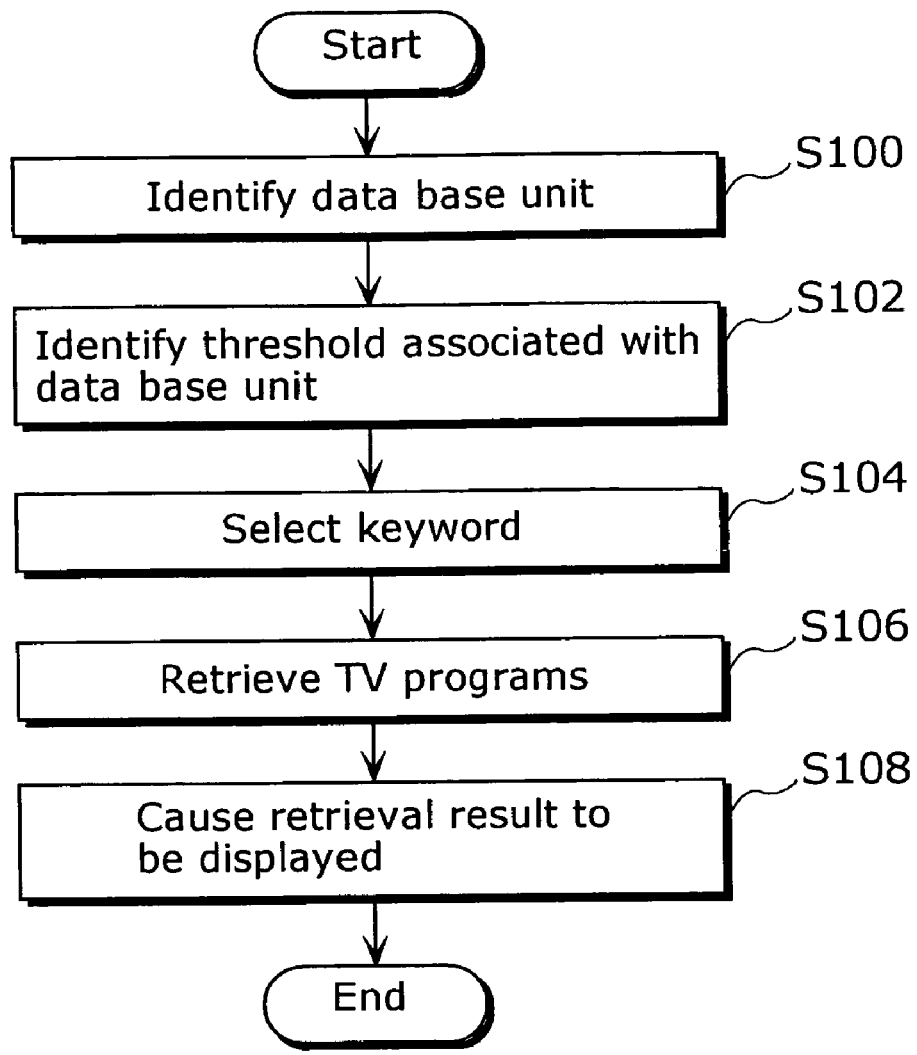

| Keyword | Weight |
|---|---|
| Matsuue Electric | 91 |
| Economy | 80 |
| Sports | 70 |
| : | : |
| Entertainment | 20 |

FIG. 14

| Device identifier | Threshold |
|---|---|
| A information device | 80 |
| B information device | 10 |

A information device

| Keyword | Weight |
|---|---|
| Matsuue Electric | 90 |
| Economy | 80 |
| Sports | 70 |
| ⋮ | ⋮ |
| Entertainment | 20 |

B information device

| Keyword | Weight |
|---|---|
| Matsuue Electric | 90 |
| Economy | 80 |
| Sports | 70 |
| ⋮ | ⋮ |
| Entertainment | 20 |

| Device identifier | Threshold |
|---|---|
| A information device | 70 |
| B information device | 10 |

A information device

| Keyword | Weight |
|---|---|
| Matsuue Electric | 90 |
| Economy | 80 |
| Sports | 70 |
| ... | ... |
| Entertainment | 20 |

B information device

| Keyword | Weight |
|---|---|
| Matsuue Electric | 90 |
| Economy | 80 |
| Sports | 70 |
| ... | ... |
| Entertainment | 20 |

FIG. 21

| Device identifier | Threshold |
|---|---|
| A information device | 80 |
| B information device | 15 |

Threshold update width table 132a

| Data base identifier | Threshold update width |||||||||||| |
|---|---|---|---|---|---|---|---|---|---|---|---|---|
| | January | February | March | April | May | June | July | August | September | October | November | December |
| Information source A data base | 0 | 0 | 10 | 10 | 10 | 10 | 10 | 10 | 10 | 5 | 0 | 0 |
| Information source B data base | 5 | 5 | 0 | 0 | 0 | 0 | 0 | 0 | 0 | 0 | 5 | 5 |
| Information source C data base | 10 | 2 | 2 | 10 | 2 | 2 | 10 | 2 | 2 | 10 | 2 | 2 |

Keyword table 123a

| Keyword | Weight |
|---|---|
| Matsuue Electric | 98 |
| Economy | 80 |
| Sports | 70 |
| : | : |
| Entertainment | 20 |

FIG. 30

| Applicable period | January | February | March | April | May | June | July | August | September | October | November | December |
|---|---|---|---|---|---|---|---|---|---|---|---|---|
| Threshold update width | 0 | 0 | 10 | 10 | 10 | 10 | 10 | 10 | 10 | 5 | 0 | 0 |

FIG. 31

| Data base identifier | Threshold update width |
|---|---|
| Information source A data base | 5 |
| Information source B data base | 20 |
| Information source C data base | 30 |

INFORMATION RETRIEVAL APPARATUS AND INFORMATION RETRIEVAL SUPPORT APPARATUS

CROSS REFERENCE TO RELATED APPLICATION

This is a continuation of application Ser. No. PCT/JP2004/019598, filed Dec. 28, 2004.

TECHNICAL FIELD

The present invention relates to an information retrieval apparatus and an information retrieval support apparatus which retrieve information associated with a user's preference.

BACKGROUND OF THE INVENTION (1) Field of the Invention

A conventional information retrieval apparatus manages user's information, and commonly uses the same user's information for information retrieval from a plurality of data bases (for example, refer to Japanese Laid-Open Patent application No. 07-152771).

Also, another conventional information retrieval apparatus manages, per category, user's information (personal preference information) indicating digitized user's preference. The information retrieval apparatus provides each information transmission source with the user's information associated with the category, the information transmission source having a respective data base. Thus, the information retrieval apparatus causes each information transmission source to execute information retrieval and the like (for example, refer to Japanese Laid-Open Patent application No. 2002-269144).

However, according to the information retrieval apparatus disclosed in the above mentioned Japanese Laid-Open Patent application No. 07-152771, all of the details included in one user's information are used for retrieving a plurality of data bases which have different use frequencies. Thus, there is a problem that information associated with the user's preference cannot be properly retrieved in the case of using a data base which has a low use frequency.

FIG. 1 is an illustration for explaining the problem caused by the information retrieval apparatus disclosed in the above mentioned Japanese Laid-Open Patent application No. H7-152771.

For example, as shown in FIG. 1, in the first data base which has a high use frequency, an Electric Program Guide (EPG) 1 of terrestrial broadcast is stored. In the second data base which has a low use frequency, an EPG 2 of Broadcast Satellite is stored. And, the information retrieval apparatus manages a single user's information 3 indicating the user's preference. In the user's information 3, starting from the user's strongest preference, for example, keywords (Matsuue Electric, economy, Ryudai Mine, sports and entertainment) and the like are sequentially stored.

The information retrieval apparatus uses all of the keywords stored in the user's information 3 in order to retrieve TV programs stored in the EPG 1 that is the first data base and in the EPG 2 that is the second data base.

In other words, from the EPG 1 that is the first data base, TV programs including the most strongly preferred keyword "Matsuue Electric" are retrieved among all genres such as news, entertainment show and variety. Also, from the EPG 2 that is the second data base, TV programs including the most strongly preferred keyword "Matsuue Electric" are retrieved among all genres.

Since the user desires to watch all of the TV programs including the key word "Matsuue Electric", the user has no complaints about the above mentioned retrieval.

Here, for example, in the terrestrial broadcast Ryudai Mine frequently appears in the genre of entertainment show, and in the Broadcast Satellite Ryudai Mine frequently appears in the genre of shopping. Since the user frequently uses the EPG 1 that is the first data base, the user expects that Ryudai Mine appears not in the genre of shopping, but in the entertainment show. Due to such expectation as described above, the user's preference for the keyword "Ryudai Mine" is not very strong.

However, the information retrieval apparatus uses, for the EPG 1 and the EPG 2, all of the keywords included in the user's information, the information retrieval apparatus being disclosed in the above mentioned Japanese Laid-Open Patent application No. 07-152771. Thus, TV programs including the keyword "Ryudai Mine" in each of the EPG 1 and the EPG 2 are retrieved in all of the genres.

As a result, the TV programs related to shopping which the user does not expect are retrieved from the EPG 2 that is the second data base. Thus, according to the above mentioned information retrieval apparatus, the TV programs associated with the user's preference cannot be properly retrieved.

In addition, for example, among the terrestrial broadcast TV programs including the keyword "entertainment" there are many TV programs which introduce drama actors and the like. Among the Broadcast Satellite TV programs including the keyword "entertainment" there are many TV programs such as kabuki. Since the user frequently uses the EPG 1 of the first data base, the user expects, from the keyword "entertainment", the TV programs which introduce drama actors and the like.

However, the information retrieval apparatus uses, for the EPG 1 and the EPG 2, all of the keywords included in the user's information, the information retrieval apparatus being disclosed in the above mentioned Japanese Laid-Open Patent application No. 07-152771. Thus, TV programs including the keyword "entertainment" in each of the EPG 1 and the EPG 2 are retrieved in all of the genres.

As a result, the TV programs related to kabuki which the user does not expect are retrieved from the EPG 2 that is the second data base. Thus, according to the above mentioned information retrieval apparatus, the TV programs associated with the user's preference cannot be properly retrieved.

Moreover, the information retrieval apparatus differentiates the user's information per information transmission source (per data base), the information retrieval apparatus being disclosed in the Japanese Laid-Open Patent application No. 2002-269144. However, the information retrieval apparatus cannot provide the information transmission source with the proper user's information, the information transmission source having a low user's use frequency. Thus, there is a problem that the information associated with the user's preference cannot be properly retrieved.

(2) Description of the Related Art

SUMMARY OF THE INVENTION

An object of the present invention, in view of the above mentioned problems, is to provide an information retrieval apparatus and an information retrieval support apparatus which can properly retrieve information associated with the user's preference from one of a plurality of data bases that have different user's use frequencies.

In order to achieve the above mentioned object, the information retrieval apparatus according to the present invention retrieves information from a plurality of data bases that accumulate different information details but are commonly used, the apparatus including: a data base identification unit that identifies one of the plurality of data bases according to a user's operation; a selection unit that preferentially selects, from a group of keywords indicating the user's preference for the common use, one or more strongly preferred keywords based on a number associated with a use frequency of the data base identified by data base identification unit; and a retrieval unit that retrieves information including the one or more keywords selected by the selection unit from the data base identified by the data base identification unit. For example, the selection unit includes: a keyword storage unit that stores, in advance, the group of keywords and a weight value indicating a degree of the user's preference for each keyword included in the group of keywords; a threshold storage unit that stores thresholds, in advance, each of the thresholds being associated with a use frequency for each of the plurality of data bases; and a keyword selection unit that reads out the threshold associated with the data base identified by the data base identification unit, and selects, from the group of keywords stored in the keyword storage unit, one or more keywords having a weight value which is (i) equal to, or larger than or (ii) equal to, or smaller than the read-out threshold.

Thus, from the group of keywords indicating the user's preference for the common use, the one or more strongly preferred keywords are preferentially selected based on the number associated with the use frequency of the data base to be retrieved. And, the one or more preferentially selected keywords are used for retrieval. For the data base having a low use frequency, the retrieval is executed only using the strongly preferred keywords by excluding the weakly preferred keywords. Thereby, information associated with the user's preference can be retrieved from one of the plurality of data bases having different use frequencies.

Also, the information retrieval apparatus may further include: an information reception unit that receives, according to the user's operation, the user's desired information from among the information retrieved by the retrieval unit; an analysis unit that makes an analysis based on the information retrieved by the retrieval unit and the user's desired information received by the information reception unit, and may derive a keyword indicating the user's preference and a weight value associated with the keyword; and a write unit that writes the keyword and the weight value derived by the analysis unit into the keyword storage unit. Here, the write unit updates the weight value of the keyword stored in the keyword storage unit to the weight value derived by the analysis unit in the case where the keyword derived by the analysis unit is already stored in the keyword storage unit.

Thus, the keyword stored in the keyword storage unit and the weight value of the keyword are updated according to the user's preference. Thereby, information associated with the change of the user's preference can be properly retrieved.

The information retrieval apparatus may further include a write judgment unit that judges whether or not the weight value should be written into the keyword storage unit, according to a use frequency of a data base which is the source of the information received by the information reception unit, wherein the write unit writes the keyword and the weight value derived by the analysis unit into the keyword storage unit in the case where the write judgment unit judges that the weight value should be written into the keyword storage unit. For example, the write judgment unit reads out a threshold of the data base which is the source of the information received by the information reception unit, and judges that the weight value should be written into the keyword storage unit in the case where the threshold is smaller or larger than a predetermined value.

Thus, learning the user's preference by using the data base having a low use frequency can be prevented. And the one or more keywords indicating the user's preference can be properly selected.

The information retrieval apparatus may further include a threshold update unit that updates the threshold of the used data base among the thresholds stored in the threshold storage unit in the case where one of the plurality of data bases has been used for retrieval.

Thus, each of the thresholds is updated according to the use of the data base. And, information associated with the user's preference can be properly retrieved adapting to the change of the use frequency of the data base.

The information retrieval apparatus may further include a period threshold update unit that updates each of the thresholds stored in the threshold storage unit in association with the each data base, according to an elapsed period for which the plurality of data bases have not been used for retrieval.

Thus, the threshold is updated according to the nonuse period of the data bases. And, information associated with the user's preference can be properly retrieved according to the change of the nonuse period of the data bases.

The information retrieval apparatus may further include an update width storage unit that stores an update width of a threshold for each calendar attribute, wherein in the case where one of the plurality of data bases has been used for retrieval, the threshold update unit identifies an update width associated with the current calendar attribute in the update width storage unit, and updates the threshold of the data base which has been used for the retrieval by the identified update width, and in the case where one of the plurality of data bases has not been used and a predetermined period has elapsed, the period threshold update unit identifies an update width associated with the current calendar attribute from the update width storage unit, and updates, by the identified update width, the threshold of the data base which has not been used for the retrieval.

Thus, the update width of the threshold changes according to the calendar. And, even in the case where the details of the information stored in each data base chronologically changes, the threshold can be properly updated.

The information retrieval apparatus may further include an update width storage unit that stores an update width of each threshold for each data base, wherein in the case where one of the plurality of data bases has been used for retrieval, the threshold update unit identifies, from the update width storage unit, an update width associated with the data base that has been used for the retrieval, and updates a threshold of the data base by the identified update width, and in the case where one of the plurality of data bases has not been used for retrieval, and a predetermined period has elapsed, the period threshold update unit identifies an update width associated with the data base that has not been used for the retrieval, and updates the threshold of the data base by the identified update width.

Thus, the threshold can be properly updated for each data base.

Here, the information retrieval apparatus may further include: a reception unit that receives the user's desired data base and a threshold according to the user's operation; and a threshold manual update unit that updates, to the threshold received by the reception unit, the threshold associated with the data base received by the reception unit.

Thus, the threshold is updated according to the user's operation. And, usability for the user can be improved.

Also, the selection unit may select one or more keywords from a group of keywords associated with the data base identified by the data base identification unit among the plurality of groups of keywords respectively associated with the each data base.

Thus, since the group of keywords are set for each data base, the one or more keywords associated with the user's preference can be properly selected.

Here, the selection unit may select one or more keywords from a group of keywords associated with a data base having a higher use frequency than the data base identified by the data base identification unit among the plurality of groups of keywords respectively associated with the each data base. For example, in the case where the use frequency of the data base identified by the data base identification unit is equal to or higher than a predetermined number, the selection unit selects one or more keywords from a group of keywords associated with the data base, and in the case where the use frequency is lower than the predetermined number, the selection unit selects one or more keywords from a group of keywords associated with a data base whose use frequency is higher than the use frequency of the data base.

Thus, the one or more keywords are selected from the group of keywords associated with the data base whose use frequency is always high. And, the one or more keywords fully reflecting the user's preference can be properly selected even for the data base having a low use frequency.

The present invention can be realized as: a retrieval method used on the above mentioned information retrieval apparatus; a program; an information retrieval support apparatus which supports the information retrieval of an information retrieval device; and an information retrieval system including the information retrieval device and the information retrieval support apparatus.

Further Information About Technical Background to this Application

The disclosure of Japanese Patent Application No. 2004-000813 filed on Jan. 6, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a concrete embodiment of the invention. In the Drawings:

FIG. 3 is a table details display diagram showing an example of the keyword table;

FIG. 4 is a table details display diagram showing an example of the threshold table;

FIG. 6 is a screen display diagram showing keywords and weights used for retrieving TV programs for the data base unit;

FIG. 7 is a table details display diagram showing details of the updated threshold table;

FIG. 8 is a screen display diagram displayed based on the updated threshold table;

FIG. 9 is a flow chart showing retrieval operations of the information retrieval apparatus;

FIG. 10 is a table details display diagram showing the threshold table updated according to the nonuse period of the second variation;

FIG. 12 is a table details display diagram showing details of the updated keyword table;

FIG. 14 is a table details display diagram showing an example of the threshold table;

FIG. 15 is a screen display diagram showing the keywords and weights used for retrieving TV programs;

FIG. 16 is a table details display diagram showing details of the manually updated threshold table;

FIG. 17 is a screen display diagram displayed based on the updated threshold table;

FIG. 21 is a table details display diagram showing the threshold table updated according to the nonuse period of the second variation;

FIG. 26 is a table details display diagram showing an example of the threshold update width table;

FIG. 30 is a table details display diagram showing details of the threshold update width table according to the third variation;

FIG. 31 is a table details display diagram showing details of the threshold update width table according to the fourth variation;

DESCRIPTION OF THE PREFERRED EMBODIMENT(S)

First Embodiment

Figure 1:
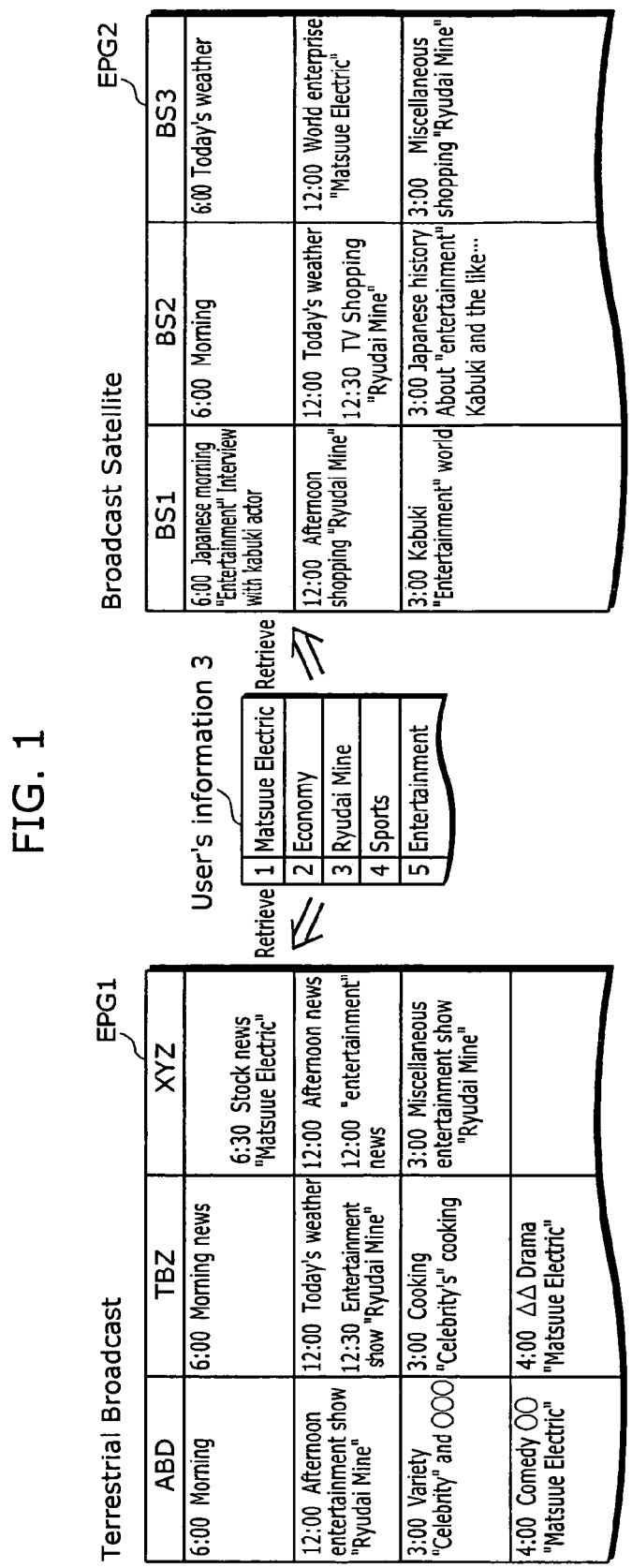
FIG. 1 is an illustration for explaining the problem with the conventional example.

The information retrieval apparatus according to the first embodiment will be explained referring to the drawings as follows.

Figure 2:
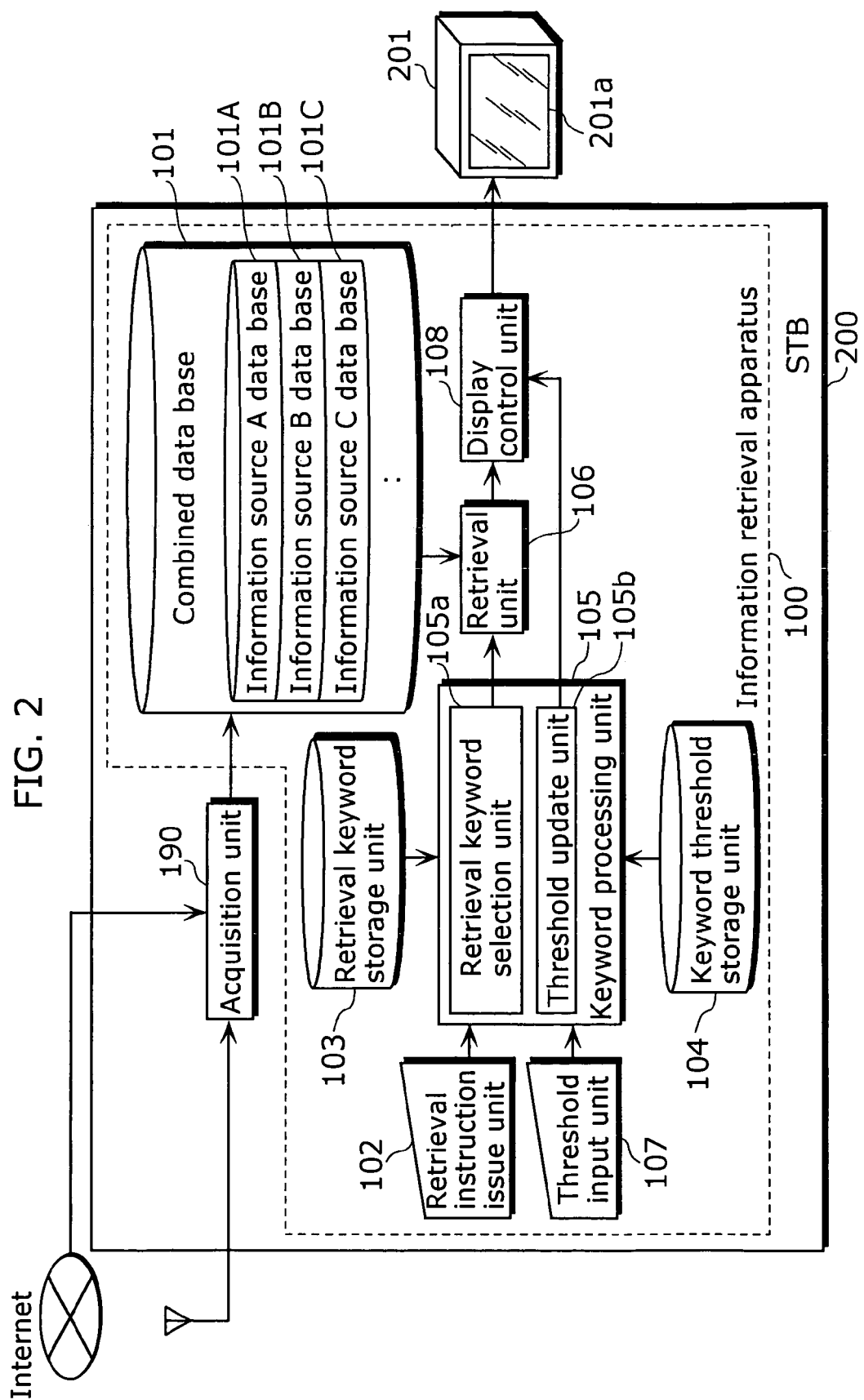
FIG. 2 is a structure diagram showing a structure of an information retrieval apparatus according to the first embodiment of the present invention.

FIG. 2 is a structure diagram showing a structure of the information retrieval apparatus according to the first embodiment of the present invention.

The information retrieval apparatus 100 is included in, for example, a Set Top Box (STB) 200. The information retrieval apparatus 100 properly retrieves TV programs associated with the user's preference from a plurality of Electric Program Guides (EPG) respectively distributed from different information sources, according to the use frequencies of these EPGs. And, the information retrieval apparatus 100 causes a display 201a of a TV 201 to display the TV programs corresponding to the retrieval result.

The STB 200 includes: the information retrieval apparatus 100; and an acquisition unit 190 which acquires the EPG via Internet or digital broadcast, and records the acquired EPG into a combined data base 101 of the information retrieval apparatus 100.

The information retrieval apparatus 100 includes: the combined data base 101; a retrieval instruction issue unit 102; a retrieval keyword storage unit 103; a keyword threshold storage unit 104; a keyword processing unit 105; a retrieval unit 106; a threshold input unit 107; and a display control unit 108.

The combined data base 101 is made up of, for example: an information source A data base 101A which stores an EPG distributed from the information source A that is a terrestrial broadcast station; an information source B data base 101B which stores an EPG distributed from the information source B that is a broadcast station of Broadcast Satellite or Communication Satellite; and an information source C data base 101C which stores an EPG distributed from the information source C that is a broadcast station of Community Antenna TV (CATV). Each of the information source A data base 101A, the information source B data base 101B and the information source C data base 101C will be referred to as data base unit as follows.

The retrieval instruction issue unit 102 identifies at least one of the information source A data base 101A, the information source B data base 101B and the information source C data base 101C. And, the retrieval instruction issue unit 102 outputs, to the keyword processing unit 105, a data base identifier indicating the identified data base unit. For example, the retrieval instruction issue unit 102 outputs, as the data base identifier, a data base name such as the information source A data base, the information source B data base and the information source C data base. As described above, the retrieval instruction issue unit 102 outputs the data base identifier, and prompts retrieving TV programs from the data base unit indicated by the data base identifier.

The retrieval keyword storage unit 103 stores a keyword table in which a group of keywords indicating the user's preference are respectively associated with each weight that is a digitized user's preference.

FIG. 3 is a table details display diagram showing an example of the keyword table.

In the keyword table 103a, as shown in FIG. 3, as "keyword, weight", the following is recorded: "Matsuue Electric, 90", "economy, 80" . . . and "entertainment, 20". Here, the larger value the weight of the keyword is, the stronger the user's preference the keyword has.

The keyword threshold storage unit 104 stores a threshold table in which the data base identifiers for identifying the information source A data base 101A, the information source B data base 101B and the information source C data base 101C are respectively associated with each threshold for each weight of the keywords.

FIG. 4 is a table details display diagram showing an example of the threshold table.

In the threshold table 104a, as shown in FIG. 4, as "data base identifier, threshold", "information source A data base, 10", "information source B data base, 80" and "information source C data base, 50" are recorded. Here, as described above, the data base identifiers are the data base names.

In the keyword table 103a of the retrieval keyword storage unit 103, the larger the weight of the keyword is, the stronger user's preference the keyword has. Therefore, in the threshold table 104a of the keyword threshold storage unit 104, the smaller the threshold of the data base unit is, the higher the user's use frequency (indicating the strong preference) of the data base unit is. In other words, the threshold indicates the user's use frequency of the data base unit.

The keyword processing unit 105 is made up of: a retrieval keyword selection unit 105a which selects, from the keyword table 103a of the retrieval keyword storage unit 103, a keyword for retrieving TV programs from the combined data base 101; and a threshold update unit 105b which updates the threshold of the threshold table 104 in the keyword threshold storage unit 104.

After acquiring a data base identifier from the retrieval instruction issue unit 102, based on the threshold of the threshold table 104a associated with the acquired data base identifier, the retrieval keyword selection unit 105a selects a keyword from the keyword table 103a. Then, the retrieval keyword selection unit 105a associates the selected keyword with the acquired data base identifier, and outputs the associated keyword and data base identifier to the retrieval unit 106.

For example, after acquiring the data base identifiers "information source A data base, information source B data base" from the retrieval instruction issue unit 102, by referring to the threshold table 104a, the retrieval keyword selection unit 105a identifies the thresholds "10, 80" associated with the acquired data base identifiers "information source A data base, information source B data base". Next, the retrieval keyword selection unit 105a selects, from the keyword table 103a,: keywords having weight whose threshold is 10 or larger associated with the data base identifier "information source A data base"; and keywords having weight whose threshold is 80 or larger associated with the data base identifier "information source B data base". Then, the retrieval keyword selection unit 105a associates the data base identifiers with the selected keywords, and outputs the associated data base identifiers and keywords. In other words, the retrieval keyword selection unit 105a outputs, as "data base identifier, keyword", "information source A data base, (Matsuue Electric, economy, sports . . . entertainment)" and "information source B data base, (Matsuue Electric, economy)".

After acquiring the data base identifier and keyword from the retrieval keyword selection unit 105a, the retrieval unit 106 retrieves information including the acquired keyword, that is, TV programs from the data base unit of the combined data base 101 associated with the acquired data base identifier. Then, the retrieval unit 106 outputs the retrieval result to the display control unit 108.

For example, after acquiring, from the retrieval keyword selection unit 105a, "information source A data base, (Matsuue Electric, economy, sports, . . . entertainment)" as "data base identifier, keyword", the retrieval unit 106 retrieves TV programs including one of the keywords "Matsuue Electric, economy, sports, . . . entertainment" from the EPG stored in the information source A data base 101A of the combined data base 101. Then, the retrieval unit 106 outputs the retrieval result to the display control unit 108. Moreover, after acquiring "information source B data base, (Matsuue Electric, economy)" from the retrieval keyword selection unit 105a, the retrieval unit 106 retrieves TV programs including one of the keywords "Matsuue Electric, economy" from the EPG stored in the information source B data base 101B of the combined data base 101. Then, the retrieval unit 106 outputs the retrieval result to the display control unit 108.

The display control unit 108 causes the display 201a of the TV 201 to display the details indicating the retrieval result outputted from the retrieval unit 106.

As described above, according to the present embodiment, from the keyword table 103a indicating the user's preference, the strongly preferred keywords are preferentially selected based the number associated with the use frequency of the data base unit. And, the TV programs are retrieved from the EPG of the data base unit, using the selected keywords. Thereby, the TV programs including weakly preferred keywords are not retrieved from the EPG having a low use frequency, as well as from the EPG having a high use frequency. Thus, the TV programs associated with the user's preference can be properly retrieved.

Figure 5:
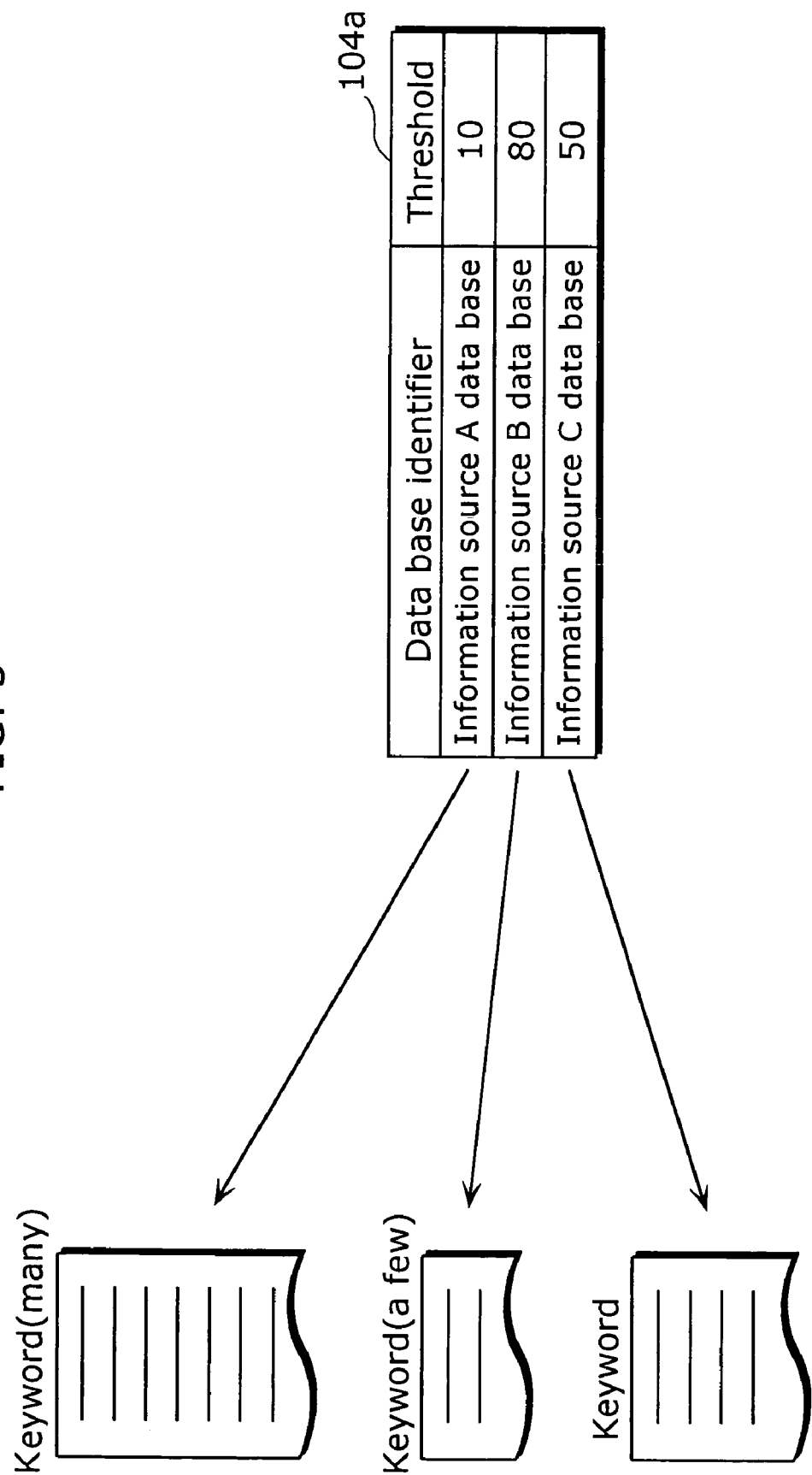
FIG. 5 is an illustration for explaining the amount of keywords used for each data base unit.

FIG. 5 is an illustration for explaining the amount of keywords used for each data base unit.

As shown in FIG. 5, for the information source A data base 101A having a low threshold, that is, a high use frequency, many keywords including weakly preferred keywords are used for retrieval. On the other hand, for the information source B data base 101B having a high threshold, that is, a low use frequency, a few keywords excluding weakly preferred keywords are used for retrieval.

As described above, according to the present embodiment, TV programs associated with the user's preference can be properly retrieved. Also, the keyword table 103a is commonly used for every data base unit. Thus, the problem with the data base having a low use frequency can be solved, the problem being described in the explanation of the information retrieval apparatus as disclosed in the Japanese Laid-Open Patent application No. 2002-269144.

According to the user's operation, the threshold input unit 107 outputs, to the keyword processing unit 105, threshold change data for prompting threshold change of the data base unit; and threshold indication data indicating the threshold after the change. Here, a mouse, a keyboard and the like may be used as the threshold input unit 107.

The threshold update unit 105b of the keyword processing unit 105 updates the threshold recorded in the threshold table 104a of the keyword threshold storage unit 104 (i) according to the threshold change data and the threshold indication data outputted from the threshold input unit 107 and (ii) according to the use frequency of the data base unit. In other words, the threshold update unit 105b updates the threshold (i) by the user's manual operation and (ii) by the automatic operation according to the use situation.

First, the operation in which the threshold update unit 105b updates the threshold by user's manual operation will be explained.

After acquiring the threshold change data from the threshold input unit 107, the threshold update unit 105b reads out: the keyword table 103a from the retrieval keyword storage unit 103; and the threshold table 104a from the keyword threshold storage unit 104. Then, based on the read-out keyword table 103a and threshold table 104a, the threshold update unit 105b identifies the keywords and weights respectively used for retrieving TV programs from each data base unit. And, the threshold update unit 105b causes the display control unit 108 to display the identified details on the display 201a of the TV 201.

FIG. 6 is a screen display diagram of the display 201a which displays keywords and weights used for retrieving TV programs from each data base unit.

After reading out the keyword table 103a and the threshold table 104a which indicates the data base identifiers "information source A data base, information source B data base and information source C data base" and the thresholds "10, 80, 50", the threshold update unit 105b identifies the keywords and weights, the keywords having weight whose threshold is 10 or larger, in the information source A data base 101A. Then, the threshold update unit 105b causes the display 201a to display the identified details, "(Matsuue Electric, 90), (economy, 80), (sports, 70) . . . (entertainment, 20)". Also, the threshold update unit 105b identifies the keywords and weights whose threshold is 80 or larger in the information source B data base 101B, and causes the display 201a to display the details, "(Matsuue Electric, 90), (economy, 80)". Furthermore, the threshold update unit 105b identifies the keywords and weights whose threshold is 50 or larger, and causes the display 201a to display the details, "(Matsuue Electric, 90) (economy, 80), (sports, 70)". Also, the threshold update unit 105b displays, with shade, the keywords and weights which are not used for retrieval in the display 201a.

Here, after the user who saw the details displayed on the display 201a, operating the threshold input unit 107, selects the desired data base unit, and inputs the threshold for the data base unit, the threshold input unit 107 outputs, to the threshold update unit 105b, threshold indication data indicating the data base identifier of the selected data base unit and the inputted threshold.

The threshold update unit 105b which has acquired the threshold indication data updates, to the threshold indicated by the threshold indication data, the threshold being already recorded in the threshold table 104a according to the data base identifier indicated by the threshold indication data. Moreover, the threshold update unit 105b causes the display control unit 108 to update the details displayed in the display 201a of the TV 201, based on the updated threshold.

For example, as a result of referring to the details displayed on the display 201a as shown in FIG. 6, in the case where the user desires to use the keyword "sports" for retrieval of the information source B data base 101B, the user selects "information source B data base" and inputs threshold "70" by operating the threshold input unit 107. As a result, the threshold update unit 105b updates the threshold "80" to "70", the threshold being included in the threshold table 104a and associated with the data base identifier "information source B data base" outputted from the threshold input unit 107.

FIG. 7 is a table details display diagram showing details of the updated threshold table 104a.

As shown in FIG. 7, being associated with the data base identifier, "information source B data base" in the threshold table 104a, the threshold "70" is newly stored.

FIG. 8 is a screen display diagram of the display 201a displayed based on the updated threshold table 104a.

As shown in FIG. 8, the shaded display of the keyword "sports" and weight "70" in the data base identifier "information source B data base" is cancelled. The user who saw such display 201a can easily understand that the keyword "sports" is used for retrieval of the information source B data base 101B.

Next, the operation in which the threshold update unit 105b automatically updates the threshold will be explained.

After together with the retrieval keyword selection unit 105a, acquiring the data base identifier from the retrieval instruction issue unit 102, the threshold update unit 105b judges that the data base unit indicated by the data base identifier has been used for retrieval. And, the threshold update unit 105b updates the threshold of the threshold table 104a associated with the data base identifier.

For example, after acquiring the data base identifiers, "information source A data base, information source B data base", from the retrieval instruction issue unit 102, the threshold update unit 105b updates (i) the thresholds "10, 80" of the threshold table 104a associated with the data base identifiers to (ii) the thresholds "5, 75" which are calculated by respectively subtracting the above mentioned thresholds by 5.

As described above, the threshold is automatically updated according to the use frequency of the data base unit. Thus, usability for the user can be improved.

A series of retrieval operations executed by the information retrieval apparatus 100 according to the present embodiment will be explained.

FIG. 9 is a flow chart showing retrieval operations of the information retrieval apparatus 100.

First, the information retrieval apparatus 100 identifies the data base unit identified by the user (step S100). Then, the information retrieval apparatus 100 identifies the threshold associated with the data base unit by referring to the threshold table 104a (step S102).

Next, the information retrieval apparatus 100 selects, from the keyword table 103a, the keyword having weight whose threshold is equal to or larger than the threshold identified in the step S102 (step S104).

After selecting the keyword, the information retrieval apparatus 100 retrieves TV programs including the keyword from the data base unit identified in the step S100 (step S106), and then causes the display 201a of the TV 201 to display the TV programs which are the retrieval result (step S108).

(First Variation)

Here, the first variation of the present embodiment regarding a retrieval method of the retrieval unit 106 will be explained.

According to the above mentioned embodiment, when the retrieval keyword selection unit 105a selects a plurality of keywords, the retrieval unit 106 retrieves TV programs which include one of these keywords. However, according to the present variation, the retrieval unit 106 adds weights of a plurality of keywords included in the details of the TV program to be retrieved, and regards, as the retrieval result, the TV program whose added weights are equal to or larger than a predetermined value.

In other words, after acquiring, from the retrieval keyword selection unit 105a, a data base identifier, keywords and weights associated with the keywords, the retrieval unit 106 adds the weights of the plurality of keywords included in the details of the TV program to be retrieved from the data base unit included in the combined data base 101 associated with the acquired data base identifier. Then, the retrieval unit 106 outputs, to the display control unit 108, the TV programs whose added weights are equal to or larger than the predetermined value.

For example, after acquiring, from the retrieval keyword selection unit 105a, "information source A data base, (Matsuue Electric, 90), (economy, 80), (sports, 70) . . . (entertainment, 20)" as "data base identifier, (keyword, weight)", the retrieval unit 106 retrieves TV programs including one of the keywords, "Matsuue Electric, economy, sports . . . entertainment" from the EPG stored in the information source A data base 101A in the combined data base 101. Moreover, the retrieval unit 106 adds weights of the keywords included in the TV program for each of the retrieved TV programs. As an example, in the case where "Matsuue Electric, economy and sports" are included in a TV program, the retrieval unit 106 adds weights associated with the keywords such as 90+80+70. Then, when the added weights exceed a predetermined threshold (for example, 200), the retrieval unit 106 outputs the TV programs whose added weights exceed the threshold to the display control unit 108.

(Second Variation)

Here, the second variation of the present embodiment regarding the update method of threshold in the threshold update unit 105b will be explained.

According to the above mentioned embodiment, the threshold update unit 105b updates the threshold of the threshold table 104a either by the user's manual operation or by the automatic operation according to the use frequency of the data base unit. However, according to the present variation, the threshold update unit 105b further updates the threshold according to the nonuse period of the data base unit.

FIG. 10 is a table details display diagram showing a threshold table 104a updated according to the nonuse period.

When one of the data bases per information source is not used, for example, for a day, the threshold update unit 105b adds five to the threshold recorded in the threshold table 104a in the data base unit. For example, in the case where the information source C data base 101C is not used for a day, as shown in FIG. 10, the threshold is updated from "50" to "55", the threshold being associated with the information source C data base 101C in the threshold table 104a.

By updating the threshold according to the nonuse period as described above, the same effects as updating the threshold according to the use frequency can be achieved.

Second Embodiment

Next, the information retrieval apparatus according to the second embodiment of the present invention will be explained referring to the drawings.

Figure 11:
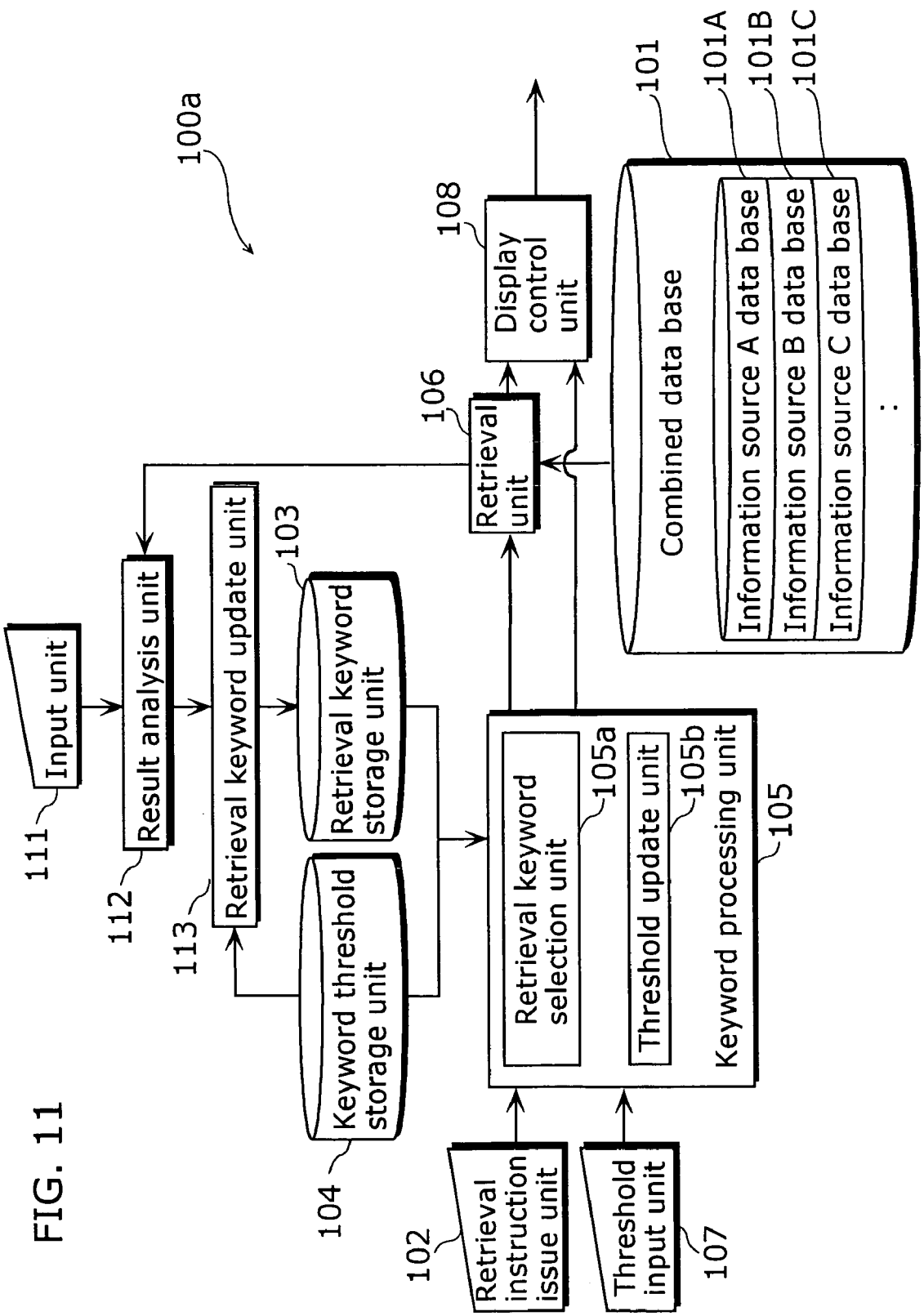
FIG. 11 is a structure diagram showing a structure of an information retrieval apparatus according to the second embodiment of the present invention.

FIG. 11 is a structure diagram showing a structure of the information retrieval apparatus according to the present embodiment.

Here, the components shown with the same reference numbers as the first embodiment have the same functions and structures as the components in the first embodiment, and the concrete explanation will be omitted.

Compared to the first embodiment, the information retrieval apparatus 100a according to the present embodiment is characterized by updating the keyword table based on the user's selection from the TV programs displayed as the retrieval result. The information retrieval apparatus 100a includes: a combined data base 101; a retrieval instruction issue unit 102; a retrieval keyword storage unit 103; a keyword threshold storage unit 104; a keyword processing unit 105; a retrieval unit 106; a threshold input unit 107; a display control unit 108; an input unit 111; a result analysis unit 112; and a retrieval keyword update unit 113.

According to the user's input, the input unit 111 determines the user's desired TV program among the TV programs retrieved by the retrieval unit 106.

After acquiring the TV programs retrieved by the retrieval unit 106, and further acquiring the TV program determined by the input unit 111, the result analysis unit 112 extracts a keyword based on the acquired details, and derives weight of the keyword. Then, the result analysis unit 112 associates: the keyword; the weight of the keyword; and the data base identifier of the data base unit in which the TV program determined by the input unit 111 is recorded; and the result analysis unit 112 outputs the associated keyword, the weight of the keyword and the data base identifier to the retrieval keyword update unit 113.

For example, the retrieval unit 106 associates the TV program including one of the keywords, "Matsuue Electric, economy, sports... entertainment", recorded in the information source A data base 101A with the data base identifier "information source A data base" and outputs the associated TV program and the data base identifier. Moreover, the retrieval unit 106 associates the TV program including one of the keywords, "Matsuue Electric, economy", recorded in the information source B data base 101B with the data base identifier, "information source B data base", and outputs the associated TV program and data base identifier. Thus, on the TV display, the retrieval result is displayed for each data base unit. Here, the user inputs, into the input unit 111, the TV program including the keyword "Matsuue Electric" stored in the information source B data base 101B. Thus, the input unit 111 determines that the inputted TV program is the user's desired TV program.

As a result, the result analysis unit 112 acquires, from the retrieval unit 106: the data base identifier "information source A data base" and the TV program retrieved in association with the data base identifier; and the data base identifier "information source B data base" and the TV program retrieved in association with the data base identifier. At the same time, the result analysis unit 112 acquires the TV program stored in the information source B data base 101B determined by the input unit 111. Then, the result analysis unit 112 analyzes the above mentioned retrieval result of the retrieval unit 106 and the determination result of the input unit 111, extracts the keyword "Matsuue Electric" and then, derives weight "80" associated with the keyword. Moreover, the result analysis unit 112 associates the keyword "Matsuue Electric", the weight "80" for the keyword and the data base identifier of the information source B data base 101B, "information source B data base", and outputs the associated keyword, weight "80" and the data base identifier to the retrieval keyword update unit 113.

After acquiring the keyword, the weight of the keyword and the data base identifier from the result analysis unit 112, the retrieval keyword update unit 113 updates the keyword table 103a of the retrieval keyword storage unit 103 by using the acquired keyword and weight of the keyword based on the threshold recorded in the threshold table 104a, in association with the acquired data base identifier.

For example, after acquiring the keyword "Matsuue Electric", weight "80" and the data base identifier "information source B data base" from the result analysis unit 112, the retrieval keyword update unit 113 divides the weight "80" of the acquired keyword by the threshold "80" associated with the data base identifier "information source B data base" and recorded in the threshold table 104a. Moreover, the retrieval keyword update unit 113 adds the value "1" which is the division result to the weight "90" for the keyword "Matsuue Electric" in the keyword table 103a, and updates the weight to "91".

FIG. 12 is a table details display diagram showing the details of the updated keyword table 103a.

As shown in FIG. 12, the weight associated with the keyword "Matsuue Electric" in the keyword table 103a is updated from "90" to "91".

According to the above mentioned embodiment, in order to update the weight by reflecting the user's use frequency of the data base unit, weight update width is calculated by the division using the threshold of the data base unit. However, there are other methods for updating the weight.

Also, when the keyword acquired from the result analysis unit 112 is not recorded in the keyword table 103a, the retrieval keyword update unit 113 associates the keyword with the weight, and additionally records the associated keyword and weight into the keyword table 103a.

As described above, according to the information retrieval apparatus 100a of the present embodiment, based on the result selected by the user from the TV programs displayed as the retrieval result, the keyword table 103a is updated, and the keyword table 103a can be adapted to the user's preference change. Also, according to the information retrieval apparatus 100a of the present embodiment, when the weight of the keyword table 103a is updated, the threshold of the data base unit is used, the data base unit being associated with the TV program selected by the user. Thus, the keyword table 103a can be adapted to the user's preference change while reflecting the user's use frequency of the data base per information.

Third Embodiment

Next, the information retrieval system according to the third embodiment of the present invention will be explained referring to the drawings.

Figure 13:
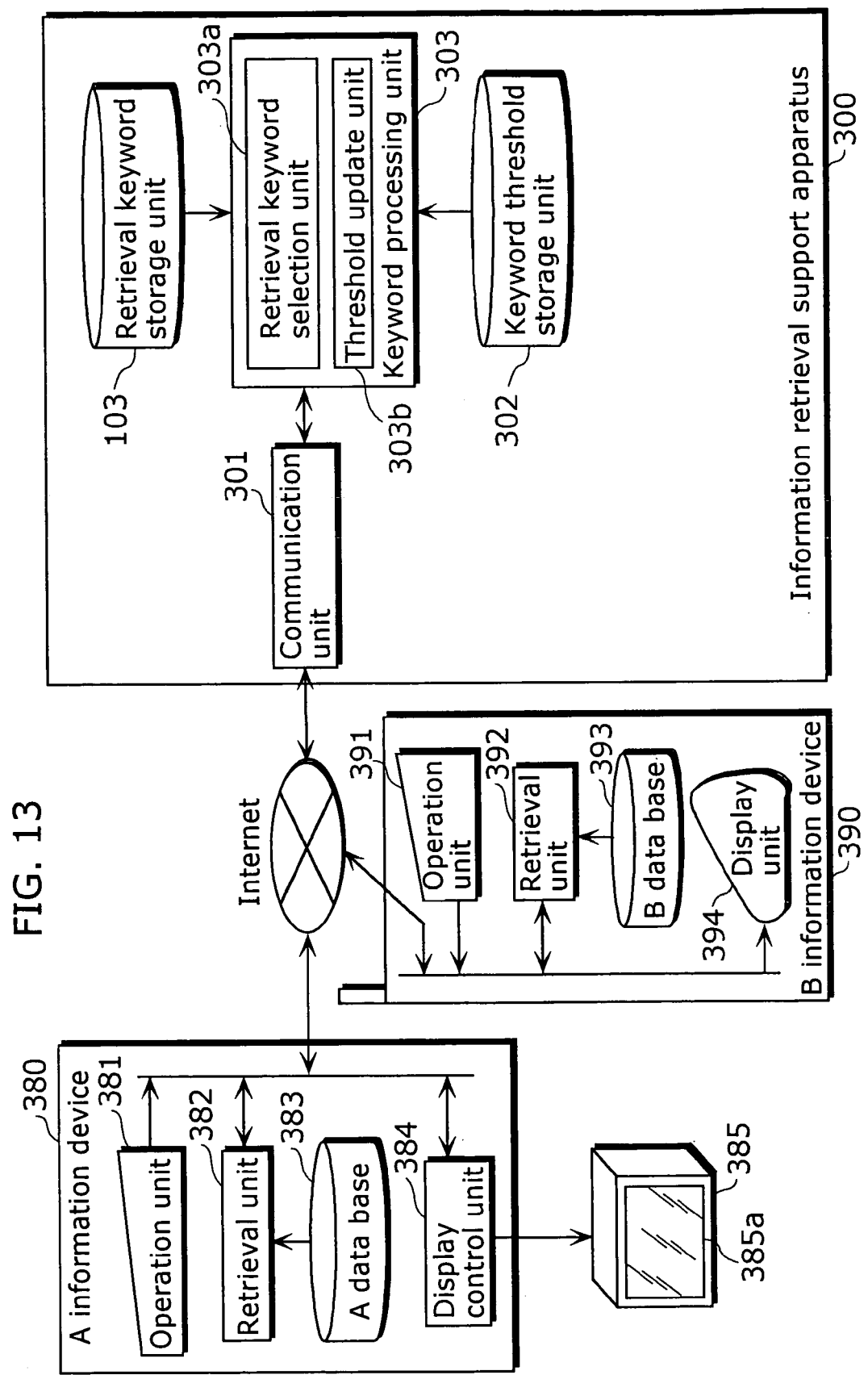
FIG. 13 is a structure diagram showing a structure of an information retrieval system according to the third embodiment of the present invention.

FIG. 13 is a structure diagram showing the structure of the information retrieval system according to the present embodiment.

Here, the components shown with the same reference numbers as the first embodiment have the same functions and structures as the components in the first embodiment, and the concrete explanation will be omitted.

The information retrieval system according to the present embodiment includes: an A information device 380 structured as a Set Top Box (STB); a B information device 390 structured as a cellular phone; and an information retrieval support apparatus 300 which is connected to each of the A information device 380 and B information device 390 via network, and transmits a keyword (keyword associated with user's preference) according to the use frequency of an Electric Program Guide (EPG) held by each information apparatus. Here, the A information device 380 and B information device 390 are used by the same user.

The A information device 380 includes: an operation unit 381 which outputs a data associated with the user's operation; an A data base 383 which stores an EPG provided from a predetermined information source; a retrieval unit 382 which retrieves TV programs from the EPG stored in the A data base 383; and a display control unit 384 which controls a display 385a of a TV 385 and causes a retrieval result and the like of the retrieval unit 382 to be displayed.

The operation unit 381 of the A information device 380 has a combined function of both the retrieval instruction issue unit 102 and the threshold input unit 107 according to the first embodiment. In other words, since the operation unit 381 staffs retrieving TV programs according to the user's operation, the operation unit 381 transmits, to the information retrieval support apparatus 300, a device identifier (for example, information device name "A information device") for identifying the A information device 380. Also, the operation unit 381 outputs, to the information retrieval support apparatus 300, according to the user's operation: threshold change data which prompts change of a threshold for the A information device 380 or the B information device 390; and threshold indication data indicating the details of the changed threshold.

After acquiring a keyword from the information retrieval support apparatus 300, the retrieval unit 382 of the A information device 380 retrieves information that is TV programs including the acquired keyword, and outputs the retrieval result to the display control unit 384. For example, after acquiring a keyword "Matsuue Electric" from the information retrieval support apparatus 300, the retrieval unit 382 retrieves TV programs including the keyword "Matsuue Electric" from the EPG stored in the A data base 383, and outputs the retrieval result to the display control unit 384.

The display control unit 384 of the A information device 380 causes the display 385a of the TV to display the details showing the retrieval result outputted from the retrieval unit 382.

The B information device 390 includes: an operation unit 391 which outputs a data associated with the user's operation; a B data base 393 which stores an EPG provided from an information source that is different from the A information device 380; a retrieval unit 392 which retrieves TV programs from the EPG stored in the B data base 393; and a display unit 394 which displays a retrieval result and the like to the retrieval unit 392.

As well as the operation unit 381 of the A information device 380, the operation unit 391 of the B information device 390 has a combined function of both the retrieval instruction issue unit 102 and the threshold input unit 107 according to the first embodiment. In other words, since the operation unit 391 starts retrieving TV programs according to the user's operation, the operation unit 391 transmits the device identifier (for example, an information device name "B information device") for identifying the B information device 390 to the information retrieval support apparatus 300. Also, the operation unit 391 outputs, to the information retrieval support apparatus 300, according to the user's operation: threshold change data which prompts change of the threshold for the A information device 380 or the B information device 390; and threshold indication data indicating the changed threshold.

As well as the retrieval unit 382 of the A information device 380, after acquiring the keyword from the information retrieval support apparatus 300, the retrieval unit 392 of the B information device 390 retrieves TV programs including the acquired keyword from the B data base, and outputs the retrieval result to the display unit 394.

The display unit 394 of the B information device 390 displays the details indicating the retrieval result outputted from the retrieval unit 392.

The information retrieval support apparatus 300 according to the present embodiment transmits a keyword according to a use frequency of information held by each information device. Then, the information retrieval support apparatus 300 causes the A information device 380 to retrieve the information including the transmitted keyword from the information held by the A information device 380. Similarly, the information retrieval support apparatus 300 causes the B information device 390 to retrieve information including the transmitted keyword from the information held by the B information device 390.

In other words, when the A information device 380 retrieves TV programs associated with the user's preference from the self-owned EPG, first, the A information device 380 acquires the keyword from the information retrieval support apparatus 300, and causes the TV 385 to display the retrieval result using the keyword. Similarly, when the B information device 390 retrieves TV programs associated with the user's preference from the self-owned EPG, first, the B information device 390 acquires the keyword from the information retrieval support apparatus 300, and causes the retrieval result to be displayed using the keyword. As described above, the information retrieval support apparatus 300 according to the present embodiment supports retrieval executed by the A information device 380 and the B information device 390.

The above mentioned information retrieval support apparatus 300 includes: a retrieval keyword storage unit 103; a communication unit 301; a keyword threshold storage unit 302; and a keyword processing unit 303.

The communication unit 301 communicates with the A information device 380 and the B information device 390 via network.

The keyword threshold storage unit 302 stores a threshold table in which a device identifier for identifying each of the A information device 380 and the B information device 390 is associated with the threshold for the weight of the keyword stored in the retrieval keyword storage unit 103.

FIG. 14 is a table details display diagram showing an example of the above mentioned threshold table.

In the threshold table 302a, as shown in FIG. 14, "A information device, 80" and "B information device, 10" are recorded as "device identifier, threshold". Here, the information device names are used as the device identifiers.

In other words, in the keyword table 103a of the retrieval keyword storage unit 103, the larger the weight is, the stronger user's preference the keyword has. Thus, in the threshold table 302a of the keyword threshold storage unit 302, the smaller the threshold is, the higher use frequency (with strong user's preference) the information device has.

The keyword processing unit 303 includes: a retrieval keyword selection unit 303a which selects, from the keyword table 103a of the retrieval keyword storage unit 103, a keyword for retrieving TV programs from the A information device 380 and the B information device 390; and a threshold update unit 303b which updates the threshold of the threshold table 302a of the keyword threshold storage unit 302.

After acquiring a device identifier via a communication unit 301 from the operation unit 381 of the A information device 380 or the operation unit 391 of the B information device 390, based on the threshold of the threshold table 302a associated with the acquired device identifier, the retrieval keyword selection unit 303a selects a keyword from the keyword table 103a, and transmits the selected keyword to the information device associated with the device identifier.

For example, after acquiring the device identifier "A information device" from the operation unit 381, the retrieval keyword selection unit 303a identifies threshold "80" associated with the acquired device identifier "A information device" referring to the threshold table 302a. Next, the retrieval keyword selection unit 303a refers to the keyword table 103a, and selects the keywords "Matsuue Electric, economy" which have the weight whose threshold is equal to or larger than 80, the keywords being associated with the device identifier "A information device". Then, the retrieval keyword selection unit 303a transmits the selected keywords "Matsuue Electric, economy" via the communication unit 301 to the A information device 380 indicated by the device identifier "A information device".

The threshold update unit 303b updates the threshold recorded in the threshold table 302a of the keyword threshold storage unit 302 according to the threshold change data and the threshold indication data transmitted from the operation unit 381 of the A information device 380 or the operation unit 391 of the B information device 390. At the same time, the threshold update unit 303b updates the threshold according to the use frequency of the information device. In other words, the threshold update unit 303b updates the threshold by the user's manual operation and by the automatic operation according to the use situation.

First, the operation in which the threshold update unit 303b updates the threshold by the user's manual operation will be explained.

After acquiring the threshold change signal from the operation units 381 and 391, the threshold update unit 303b reads out: the keyword table 103a from the retrieval keyword storage unit 103; and the threshold table 302a from the keyword threshold storage unit 302. Then, based on the read-out keyword table 103a and threshold table 302a, the threshold update unit 303b identifies, per information device, the keyword and weight used for retrieving TV programs. Moreover, the threshold update unit 303b transmits the identified details to the information device which has transmitted the threshold change signal, and causes the information device to display the identified details.

FIG. 15 is a screen display diagram in which the keyword and weight used for retrieving TV programs are displayed.

After reading out the keyword table 103a and the threshold table 302a indicating the device identifiers "A information device, B information device" and the thresholds "80, 10", the threshold update unit 303b identifies: the keyword and the weight whose threshold is equal to or larger than 80 for the A information device 380; and the keyword and the weight whose threshold is equal to or larger than 10 for the B information device 390. Then, the threshold update unit 303b causes the display 385a of the TV 385 in, for example, the A information device 380 to display the details "(Matsuue Electric, 90), (economy, 80)" identified for the A information device 380 and the details "(Matsuue Electric, 90), (economy, 80), (sports, 70) . . . (entertainment, 20)" identified for the B information device 390, the A information device 380 having transmitted the threshold change data. Also, the threshold update unit 303b causes the display 385a to display, with shade, the keyword and weight which are not used for retrieval. Here, after the user who saw the details displayed on the display 385a operates the operation unit 381a of the A information device 380, the operation unit 381a selects the desired information device, and then inputs the threshold for the information device. And, the operation unit 381 transmits the device identifier of the selected information device and the threshold indication data indicating the inputted threshold to the threshold update unit 303b.

The threshold update unit 303b which has acquired the above mentioned threshold indication data updates the threshold associated with the device identifier indicated by the threshold indication data and already recorded in the threshold table 302a to the threshold indicated by the threshold indication data. Moreover, based on the updated threshold, the threshold update unit 303b causes the display control unit 384 of the A information device 380 to update the details displayed on the TV 385.

For example, in the case where as a result of referring to the details displayed on the display, the user desires to use the keyword "sports" for retrieval in the A information device 380, the user operates the operation unit 381, selects the "A information device", and then inputs the threshold "70". As a result, the threshold update unit 303b updates the threshold "80" to the threshold "70", the threshold "80" being stored in the threshold table 302a associated with the device identifier "A information device" outputted from the operation unit 381.

FIG. 16 is a table details display diagram showing details of the manually updated threshold table 302a.

As shown in FIG. 16, the threshold "70" is newly stored in association with the device identifier "A information device" of the threshold table 302a.

FIG. 17 is a screen display diagram of the display displayed based on the updated threshold table 302a.

As shown in FIG. 17, the shaded display of the keyword "sports" of the device identifier "A information device" and weight "70" is cancelled. The user who saw such display 385a can easily understand that the keyword "sports" is used for retrieval of the A information device 380.

Next, the operation in which the threshold update unit 303b automatically updates the threshold will be explained.

After acquiring the device identifier together with the retrieval keyword selection unit 303a from the operation units 381 and 391, the threshold update unit 303b judges that the information device of the device identifier has been used for retrieval, and updates the threshold of the threshold table 302a associated with the device identifier.

For example, after acquiring the device identifier "A information device" from the operation unit 381, the threshold update unit 105b updates the threshold "80" of the threshold table 302a associated with the device identifier to the threshold "75" which is calculated by subtracting the above mentioned threshold by 5.

Figure 18:
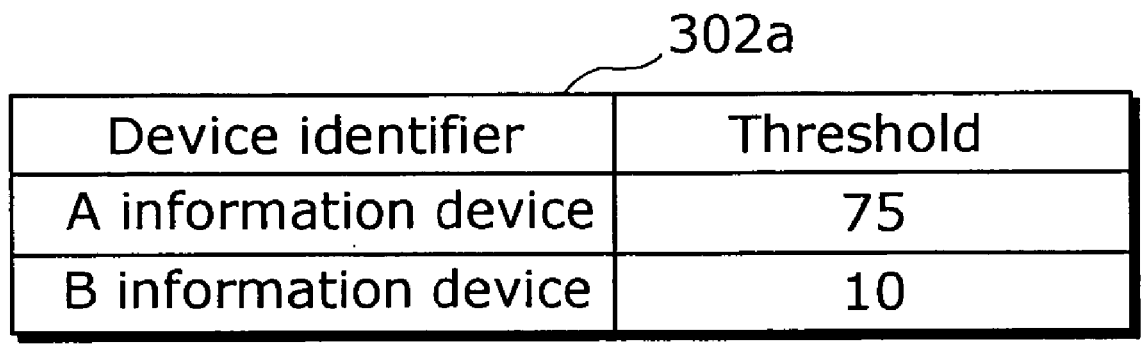
FIG. 18 is a table details display diagram showing details of the automatically updated threshold table.

FIG. 18 is a table details display diagram showing details of the automatically updated threshold table 302a.

As shown in FIG. 18, the threshold "75" is newly stored in association with the device identifier "A information device" of the threshold table 302a.

A series of retrieval operations of the information retrieval system according to the present embodiment will be explained.

Figure 19:
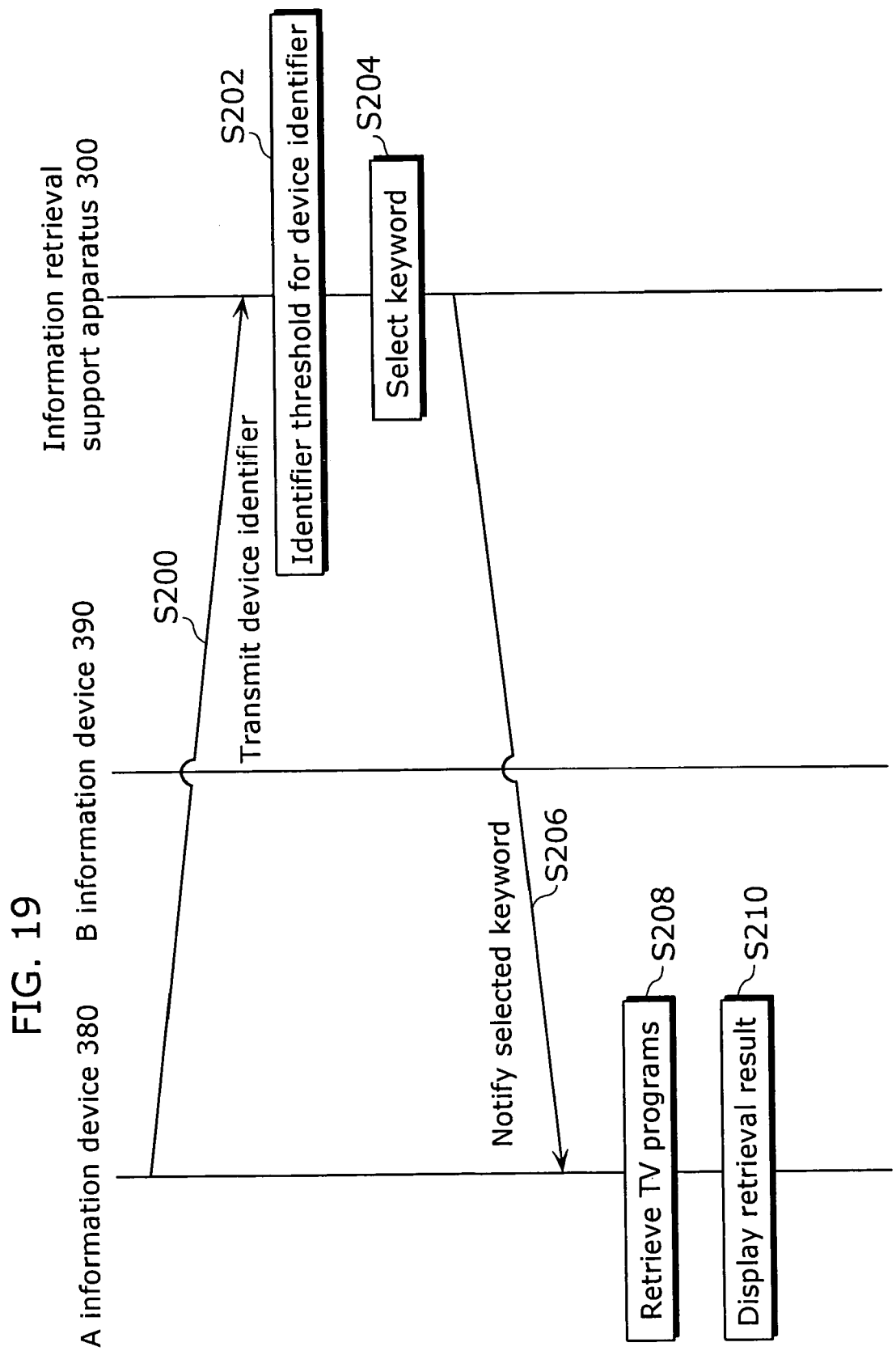
FIG. 19 is a sequence diagram showing an example of the retrieval operations in the information retrieval system.

FIG. 19 is a sequence diagram showing an example of the retrieval operations of the information retrieval system.

First, the A information retrieval device 380 transmits the device identifier "A information device" to the information retrieval support apparatus 300 based on the user's operation (step S200). After acquiring the device identifier "A information device", the information retrieval support apparatus 300 refers to the threshold table 302a, identifies the threshold for the device identifier (step S202), and then selects a keyword having weight whose threshold is equal to or larger than the identified threshold from the keyword table 103a (step S204). Then, the information retrieval support apparatus 300 notifies, via network, the keyword selected in the step S204 to the A information device 380 associated with the device identifier "A information device" (step S206).

Next, the A information device 380 retrieves TV programs using the keyword notified from the information retrieval support apparatus 300 (step S208), and causes the TV 385 to display the retrieval result (step S210).

As described above, according to the present embodiment, the information retrieval support apparatus 300 preferentially selects one or more strongly preferred keywords, as many as the number associated with the use frequency of the information device, from the keyword table 103a, and transmits the selected keyword(s) to the A information device 380 and B information device 390. Thus, as well as the first embodiment, the A information device 380 and the B information device 390 can properly retrieve TV program(s) associated with the user's preference even if respective use frequencies are low.

(First Variation)

Here, the first variation of the present embodiment regarding the update of the keyword table 103a will be explained.

Figure 20:
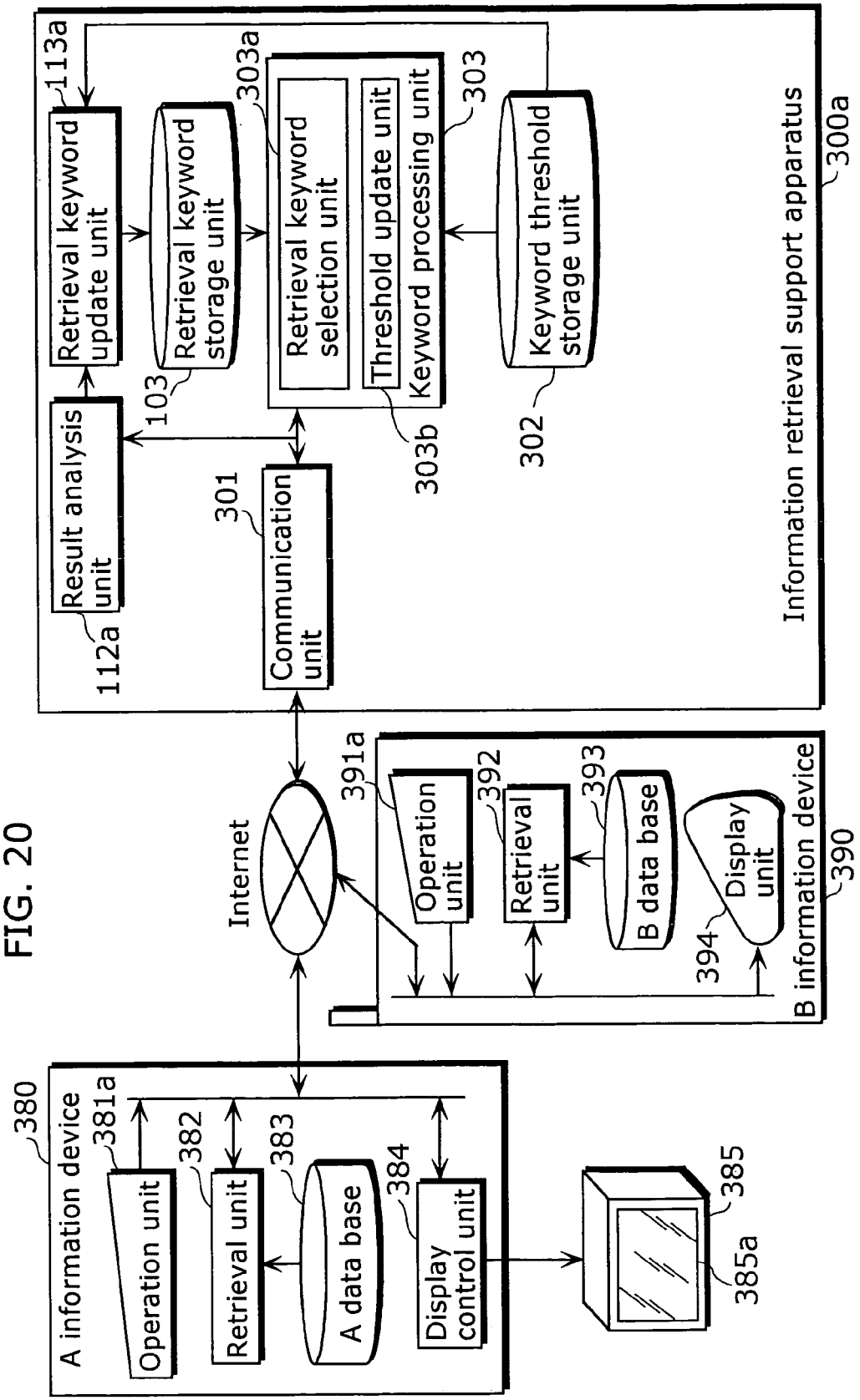
FIG. 20 is a structure diagram showing a structure of the above mentioned information retrieval system according to the first variation.

FIG. 20 is a structure diagram showing a structure of the information retrieval system according to the present variation.

The information retrieval support apparatus 300a according to the present variation includes: a result analysis unit 112a and a retrieval keyword update unit 113a which respectively have the same functions and structures as the result analysis unit 112 and the retrieval keyword update unit 113 according to the second embodiment. Also, the operation unit 381a of the A information device 380 and the operation unit 391a of the B information device 390 respectively have a function of the input unit 111 according to the second embodiment.

In other words, as well as the information retrieval apparatus 100a of the second embodiment, the information retrieval support apparatus 300a according to the present variation updates the keyword table 103a so that the keyword table 103a is adapted to the user's preference change, based on the result selected by the user from the TV programs displayed as the retrieval result.

Concretely, after acquiring TV programs retrieved from the retrieval units 382 and 392, and further acquiring the TV programs determined by the operation units 381a and 391a, the result analysis unit 112a of the present variation extracts the keyword based on the acquired details, and derives the weight of the keyword. Then, the result analysis unit 112a associates the keyword, the weight of the keyword and the device identifier of the information device in which the TV programs determined by the operation units 381a and 391a were recorded, and outputs the associated keyword, weight of the keyword and device identifier to the retrieval keyword update unit 113a.

For example, as a retrieval result, the retrieval unit 382 associates the TV programs including one of the keywords "Matsuue Electric, economy" recorded in the A information device 380 with the device identifier "A information device", and outputs the associated TV programs and device identifier to the display control unit 384 and the result analysis unit 112a. Thus, on the display 385a of the TV 385, the retrieval result is displayed. Here, the user inputs the TV programs including the keyword "Matsuue Electric" into the operation unit 381a. And, the operation unit 381a determines that the inputted TV programs are the user's desired TV programs.

As a result, the result analysis unit 112a acquires, from the retrieval unit 382, the device identifier "A information device" and the TV programs retrieved in association with the device identifier, and acquires the TV programs determined by the operation unit 381a via network. Then, the result analysis unit 112a analyzes the retrieval result of the retrieval unit 382 and the determined result of the operation unit 381a, extracts the keyword "Matsuue Electric", and derives the weight "80" for the keyword. Moreover, the result analysis unit 112a associates the keyword "Matsuue Electric", the weight "80" for the keyword and the device identifier "A information device" of the A information device 380, and outputs the associated keyword, weight and device identifier to the retrieval keyword update unit 113a.

After acquiring the keyword, the weight of the keyword and the device identifier from the result analysis unit 112a, the retrieval keyword update unit 113a updates the keyword table 103a of the retrieval keyword storage unit 103 using the acquired keyword and weight of the keyword, based on the threshold associated with the acquired device identifier and recorded in the threshold table 302a.

For example, after acquiring the keyword "Matsuue Electric", weight "80" and device identifier "A information device" from the result analysis unit 112a, the retrieval keyword update unit 113a divides the acquired weight of the keyword "80" by the threshold "80" associated with the device identifier "A information device" and recorded in the threshold table 302a. Moreover, the retrieval keyword update unit 113a adds the value "1" which is the division result to the weight "90" for the keyword "Matuue Electirc" of the keyword table, and updates the weight to "91".

Also, when the keyword acquired from the result analysis unit 112a is not recorded in the keyword table 103a, the retrieval keyword update unit 113a associates the keyword with the weight, and additionally records the associated keyword and weight into the keyword table 103a.

(Second Variation)

Here, the second variation of the present embodiment regarding the update method for the threshold of the threshold update unit 303b will be explained.

According to the above mentioned embodiment, the threshold update unit 303b updates the threshold of the threshold table 302a by the user's manual operation or by the automatic operation according to the use frequency of the information device. However, the threshold update unit 303b according to the present variation further updates the threshold according to the nonuse period of the information device.

FIG. 21 is a table details display diagram showing the threshold table 302a updated according to the nonuse period.

When one of the information devices is not used for retrieval, for example, for a day, the threshold update unit 303b adds 5 to the threshold associated with the information device and recorded in the threshold table 302a, and updates the threshold. For example, in the case where the B information device 390 is not used for a day, as shown in FIG. 21, the threshold of the threshold table 302a is updated from "10" to "15".

As described above, by updating the threshold according to the nonuse period, the same effects can be achieved as updating the threshold according to the use frequency.

(Third Variation)

Here, the third variation of the present embodiment regarding the direction for the retrieval start and the display of the retrieval result will be explained.

Figure 22:
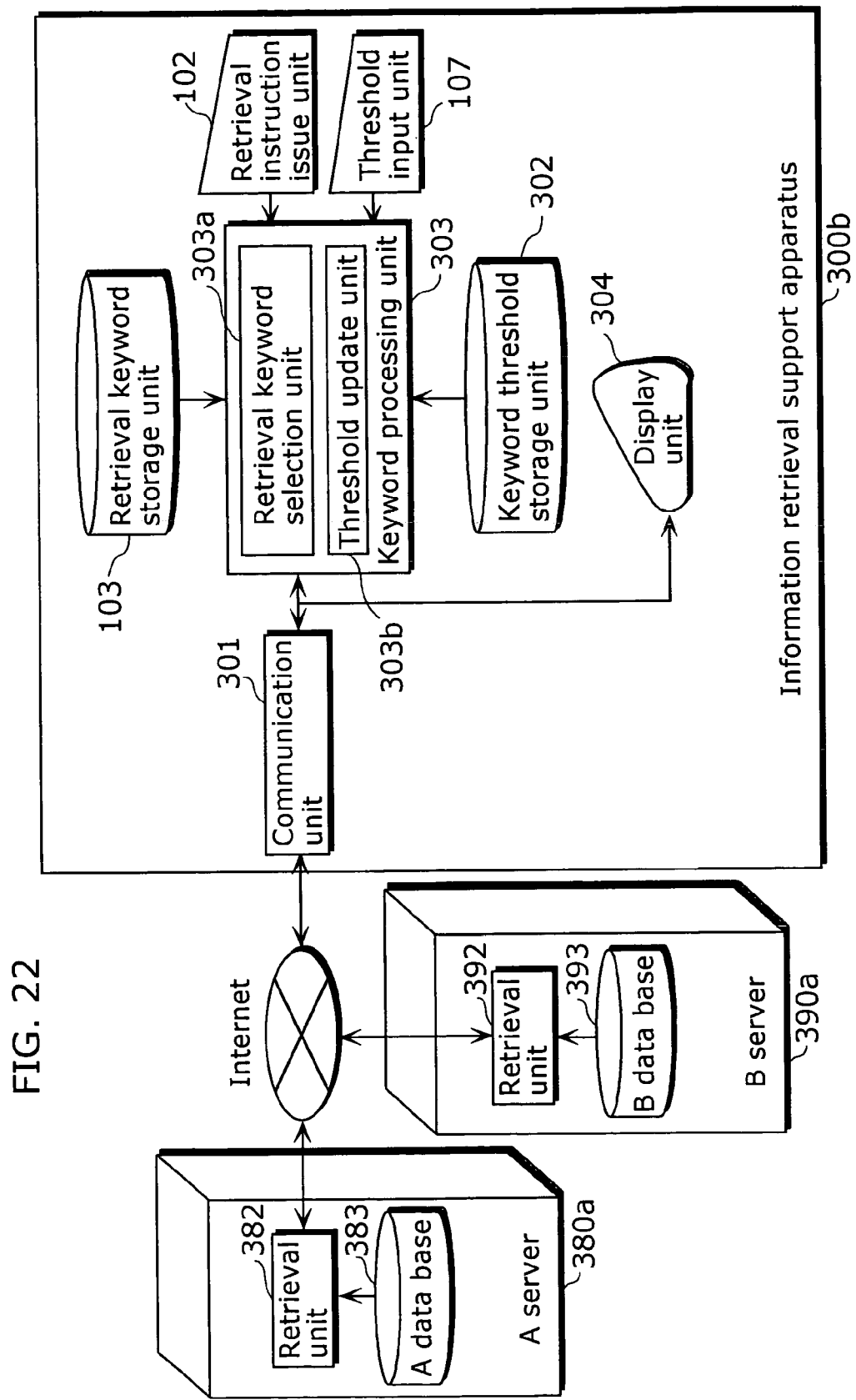
FIG. 22 is a structure diagram showing a structure of the above mentioned information retrieval system according to the third variation.

FIG. 22 is a structure diagram showing a structure of the information retrieval system according to the present variation.

Here, the components shown with the same codes as the first and second embodiments have the same functions and structures as the first and second embodiments, and the concrete explanation will be omitted.

The information retrieval system according to the present variation includes: an A server 380a made up of the retrieval unit 382 and the A data base 383; a B server 390a made up of the retrieval unit 392 and the B data base 393; and an information retrieval support apparatus 300b which is connected to each of the A server 380a and the B server 390a via network, and transmits the keyword (keyword associated with the user's preference) according to the use frequency of the Electric Program Guide (EPG) held by each server.

Here, the information retrieval support apparatus 300b is used by the user who directs the retrieval. In other words, according to the above mentioned embodiments, the user directs the information retrieval support apparatus to start retrieval from the side of the information device. However, in the information retrieval system according to the present variation, the user directs the retrieval start from the side of the information retrieval support apparatus.

After acquiring the keyword from the information retrieval support apparatus 300b, the retrieval unit 382 of the A server 380a retrieves information including the acquired keyword, that is TV programs, and transmits the retrieval result to the information retrieval support apparatus 300b.

As well as the retrieval unit 382 of the A server 380a, after acquiring the keyword from the information retrieval support apparatus 300b, the retrieval unit 392 of the B server 390b retrieves TV programs including the acquired keyword from the B data base 393, and transmits the retrieval result to the information retrieval support apparatus 300b.

The information retrieval support apparatus 300b is connected to the A server 380a and the B server 390a via network, and transmits the keyword associated with the use frequency of each server respectively to the A server 380a and the B server 390a. As a result, the information retrieval support apparatus 300b causes the A server 380a to retrieve information including the transmitted keyword from the information held by the A server 380a, and similarly causes the B server 390a to retrieve information including the transmitted keyword from the information held by the B server 390a. Then, the information retrieval support apparatus 300b displays the result retrieved from each server.

Concretely, the information retrieval support apparatus 300b includes: a retrieval keyword storage unit 103; a communication unit 301; a keyword threshold storage unit 302; a keyword processing unit 303; a retrieval instruction issue unit 102; a threshold input unit 107; and a display unit 304.

The display unit 304 displays the retrieval results transmitted from the A server 380a and the B server 390a, and displays the threshold table 302a both before and after the update according to the operation of the threshold update unit 303b. For example, after acquiring, via the communication unit 301, the retrieval result retrieved using the keywords "Matsuue Electric, economy" from the A server 380a, the display unit 304 displays the acquired retrieval result.

As described above, the information retrieval support apparatus 300b of the present variation includes the retrieval instruction issue unit 102 and the threshold input unit 107. And, the user can identify the A server 380a or the B server 390a from the information retrieval support apparatus 300b, cause the identified server to execute the retrieval, and manually update the threshold.

A series of retrieval operations in the information retrieval system according to the present variation will be explained.

Figure 23:
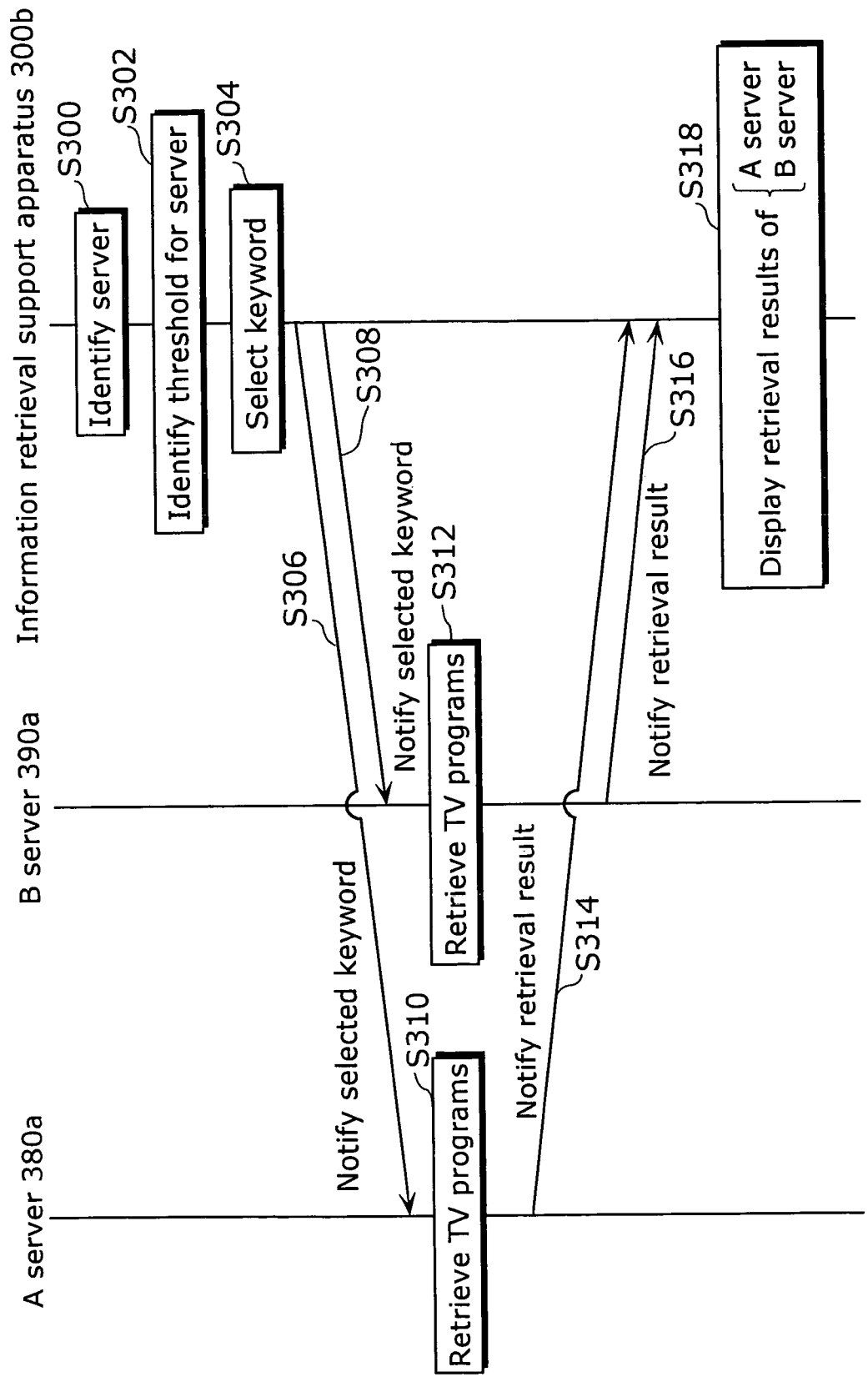
FIG. 23 is a sequence diagram showing an example of the information retrieval system according to the third embodiment.

FIG. 23 is a sequence diagram showing an example of the retrieval operations in the information retrieval system according to the present variation.

First, the information retrieval support apparatus 300b identifies the server to be retrieved based on the user's operation (step S300). For example, the information retrieval support apparatus 300b identifies the A server 380a and the B server 390a. Then, the information retrieval support apparatus 300b refers to the threshold table 302a, and identifies the thresholds for the A server 380a and the B server 390a (step S302).

Next, the information retrieval support apparatus 300b selects the keyword having weight whose threshold is equal to or larger than 80 for the A server 380a, and selects the keyword having weight whose threshold is equal to or larger than 10 for the B server 390a (step S304). And, the information retrieval support apparatus 300b notifies each selected keyword respectively to the A server 380a and the B server 390b (steps S306 and S308).

Each of the A server 380a and the B server 390a which have acquired the respective keywords from the information retrieval support apparatus 300b retrieves TV programs including the acquired keyword from the self-owned EPG (steps S310 and S312), and transmits the retrieval result to the information retrieval support apparatus 300b (steps S314 and S316).

After acquiring each retrieval result respectively from the A server 380a and the B server 390b, the information retrieval support apparatus 300b causes the display unit 304 to display the retrieval result (step S318).

Fourth Embodiment

Next, the information retrieval apparatus according to the fourth embodiment of the present invention will be explained referring to the drawings.

Figure 24:
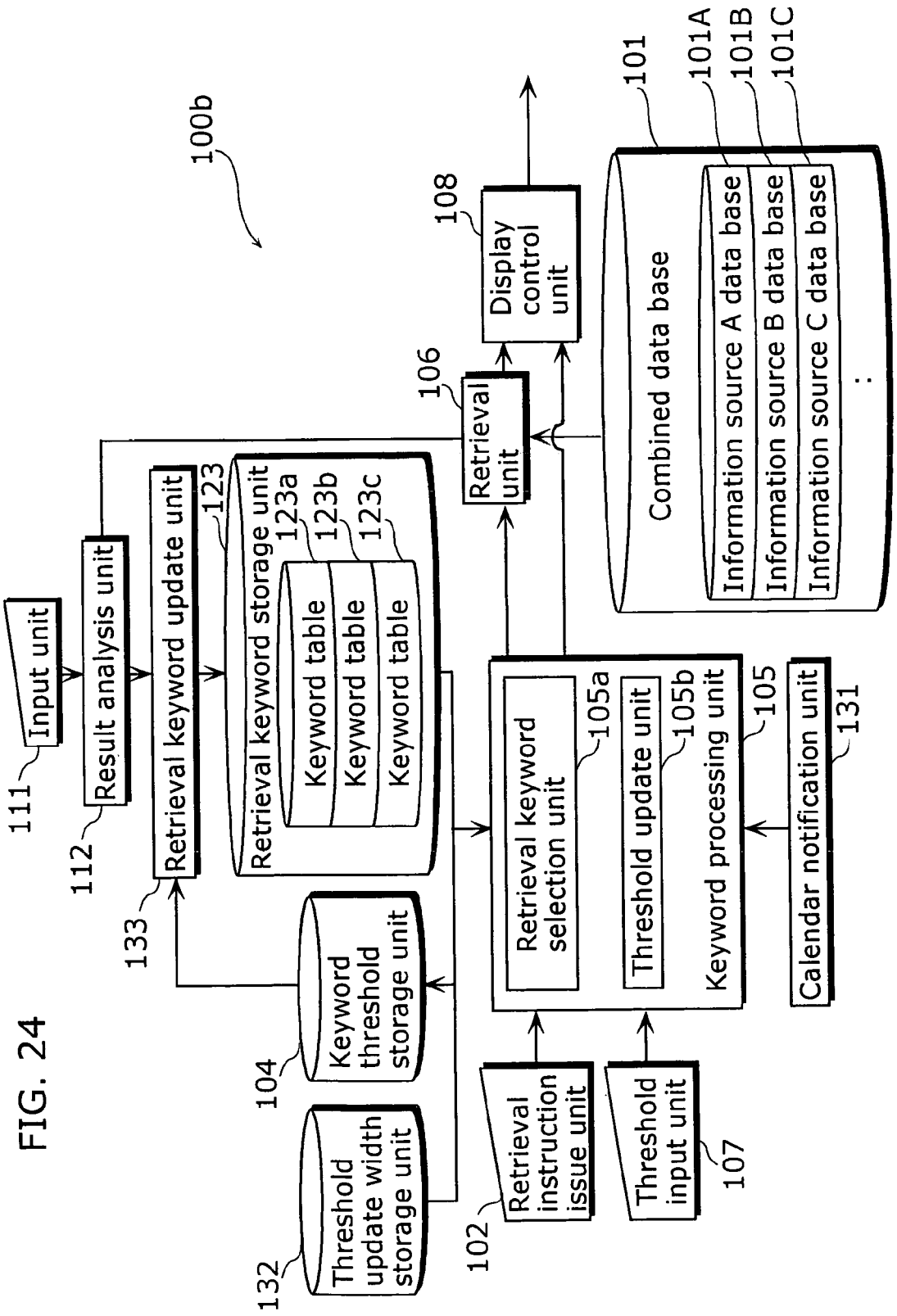
FIG. 24 is a structure diagram showing a structure of an information retrieval apparatus according to the fourth embodiment of the present invention.

FIG. 24 is a structure diagram showing a structure of the information retrieval apparatus according to the present embodiment.

Here, the components shown with the same reference numbers as the first or second embodiment have the same functions and structures as the components of the first or second embodiment, and the concrete explanation will be omitted.

The information retrieval apparatus 100b according to the present embodiment includes: a combined data base 101; a retrieval instruction issue unit 102; a retrieval keyword storage unit 123; a keyword threshold storage unit 104; a keyword processing unit 125; a retrieval unit 106; a threshold input unit 107; a display control unit 108; an input unit 111; a result analysis unit 112; a retrieval keyword update unit 133; a calendar notification unit 131; and a threshold update width storage unit 132.

The retrieval keyword storage unit 123 stores, for each data base unit, keyword tables 123a, 123b and 123c in each of which a group of keywords indicating user's preference are associated with weight that is digitized user's preference for each keyword.

Figure 25:
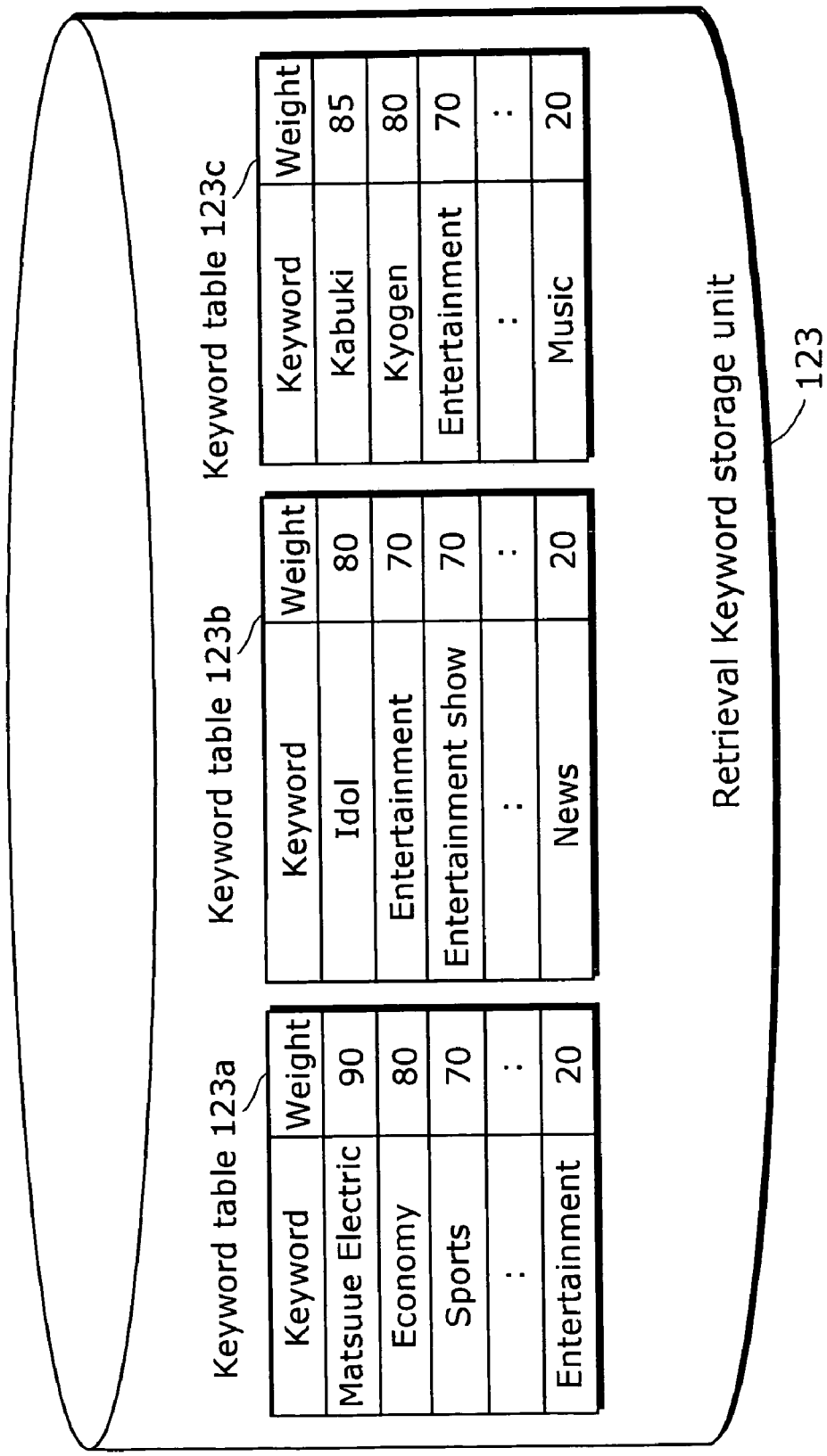
FIG. 25 is a table details display diagram showing an example of the keyword table.

FIG. 25 is a table details display diagram showing an example of the keyword table.

The key word table 123a is used for retrieving TV programs from the information source A data base 101A. And, in the keyword table 123a as shown in FIG. 25, as "keyword, weight", "Matsuue Electric, 90", "economy, 80" . . . and "entertainment, 20" are recorded. Here, the larger the weight is, the stronger user's preference the keyword has.

The keyword table 123b is used for retrieving TV programs from the information source B data base 101B. And, in the keyword table 123b as shown in FIG. 25, as "keyword, weight", "idol, 80", "entertainment, 70" . . . and "news, 20" are recorded. Here again, as described above, the larger the weight is, the stronger user's preference the keyword has.

The keyword table 123c is used for retrieving TV programs from the information source C data base 101C. And, in the keyword table 123c as shown in FIG. 25, as "keyword, weight", "kabuki, 85", "kyogen, 80" . . . and "music, 20" are recorded. Here again, as described above, the larger the weight is, the stronger user's preference the keyword has.

The threshold update width storage unit 132 stores the threshold update width table. In the threshold update width table, each data base identifier of the information source A data base 101A, the information source B data base 101B and the information source C data base 101C is associated with the threshold update width of each month, and displayed.

FIG. 26 is a table details display diagram showing an example of the threshold update width table.

For example, as shown in FIG. 26, the threshold update width table 132a displays, for the data base identifier "information source A data base", the threshold update width "0" of January, the threshold update width "10" of March and the like. Also, the threshold update width table 132a displays, for the data base identifier "information source B data base", the threshold update width "5" of January, the threshold update width "0" of March and the like. Moreover, the threshold update width table 132a displays, for the data base identifier "information source C data base", the threshold update width "10" of January, the threshold update width "2" of February and the like.

The above mentioned threshold update width table 132a is distributed along with the EPG from the information source, or generated by the user so as to be stored into the threshold update width storage unit 132. In the case where the threshold update width table 132a is distributed, for example, according to the information amount such as special TV programs and baseball programs of each month, the update width is set in the threshold update width table 132a. Also, in the case where the user generates the threshold update width table 132a, the user first causes the information retrieval apparatus 100 to retrieve TV programs based on the threshold update width table 132a set using, for example, default values, and updates the details of the threshold update width table 132a based on the retrieval result.

The calendar notification unit 131 has a calendar function and the like, and notifies the current month to the keyword processing unit 125 according to the request from the keyword processing unit 125.

As well as the keyword processing unit 105 in the first or second embodiment, the keyword processing unit 125 includes: a retrieval keyword selection unit 125a which selects, from the keyword tables 123a, 123b and 123c of the retrieval keyword storage unit 123, the keyword for retrieving TV programs from the combined data base 101; and a threshold update unit 125b which updates the threshold of the threshold table 104a in the keyword threshold storage unit 104.

After acquiring the data base identifier from the retrieval instruction issue unit 102, the retrieval keyword selection unit 125a identifies a keyword table associated with the acquired data base identifier "data base unit" from the retrieval keyword storage unit 123. Then, the retrieval keyword selection unit 125a selects a keyword from the identified keyword table based on the threshold of the threshold table 104a associated with the acquired data base identifier, associates the selected keyword with the acquired data base identifier, and then outputs the associated keyword and data base identifier to the retrieval unit 106.

For example, after acquiring the data base identifier "information source A data base" from the retrieval instruction issue unit 102, the retrieval keyword selection unit 125a identifies the keyword table 123a from the retrieval keyword storage unit 123 as the keyword table associated with the data base identifier "information source A data base". Then, the retrieval keyword selection unit 125a refers to the threshold table 104a, and identifies the threshold "10" associated with the acquired data base identifier "information source A data base". Next, the retrieval keyword selection unit 125a selects, from the keyword table 123a, the keyword having the weight whose threshold is equal to or larger than 10, the keyword being associated with the data base identifier "information source A data base". Then, the retrieval keyword selection unit 125a outputs "information source A data base, (Matsuue Electric, economy, sports, . . . entertainment)" as "data base identifier, keyword".

The threshold update unit 125b updates the threshold recorded in the threshold table 104a of the keyword threshold storage unit 104 according to the threshold change data and the threshold indication data transmitted from the threshold input unit 107, and according to the use frequency of the data base unit. In other words, the threshold update unit 125b updates the threshold by the user's manual operation and by the automatic operation according to the use situation.

Here, when updating the threshold according to the use frequency of the data base unit, the threshold update unit 125b according to the present embodiment refers to the threshold update width table 132a of the threshold update width storage unit 132, and determines the update width of the threshold.

In other words, after acquiring the data base identifier together with the retrieval keyword selection unit 105a from the retrieval instruction issue unit 102, the threshold update unit 125b judges that the data base unit indicated by the data base identifier has been used for retrieval. Here, the threshold update unit 125b makes a request to the calendar notification unit 131, and receives notification of the current month. Then, the threshold update unit 125b identifies, from the threshold update width table 132a, the threshold update width associated with the data base identifier and month. The threshold update unit 125b updates the threshold by subtracting, by the identified threshold update width, the threshold of the threshold table 104a associated with the data base identifier.

For example, after acquiring the data base identifier "information source A data base" from the retrieval instruction issue unit 102, and receiving notification of October from the calendar notification unit 131, the threshold update unit 125b identifies, from the threshold update width table 132a, the threshold update width "5" associated with the "information source A data base" and "October". Then, the threshold update unit 125b updates the threshold "10" of the threshold table 104a associated with the "information source A data base" to the threshold "5" which is calculated by subtracting the above mentioned threshold by the threshold update width "5". Also, after acquiring the data base identifier "information source B data base" from the retrieval instruction issue unit 102, and receiving notification of June from the calendar notification unit 131, the threshold update unit 125b identifies, from the threshold update width table 132a, the threshold update width "0" associated with the "information source B data base" and "June". Then, the threshold update unit 125b updates the threshold "80" of the threshold table 104a associated with the "information source B data base" to the threshold "80" which is calculated by subtracting the above mentioned threshold by the threshold update width "0".

Also, the threshold update unit 125b according to the present embodiment further updates the threshold according to the nonuse period of the data base unit.

When one of the data bases per information source is not used, for example, for a day, the threshold update unit 125b first identifies the data base unit. Then, as described above, the threshold update unit 125b makes a request to the calendar notification unit 131, and receives a notification indicating the current month. The threshold update unit 125b identifies, from the threshold update width table 132a, the threshold update width associated with the data base identifier and the month. The threshold update unit 125b updates the threshold increasing the threshold by the identified threshold update width, the threshold being stored in the threshold table 104a associated with the data base identifier.

Figures 27, 28:
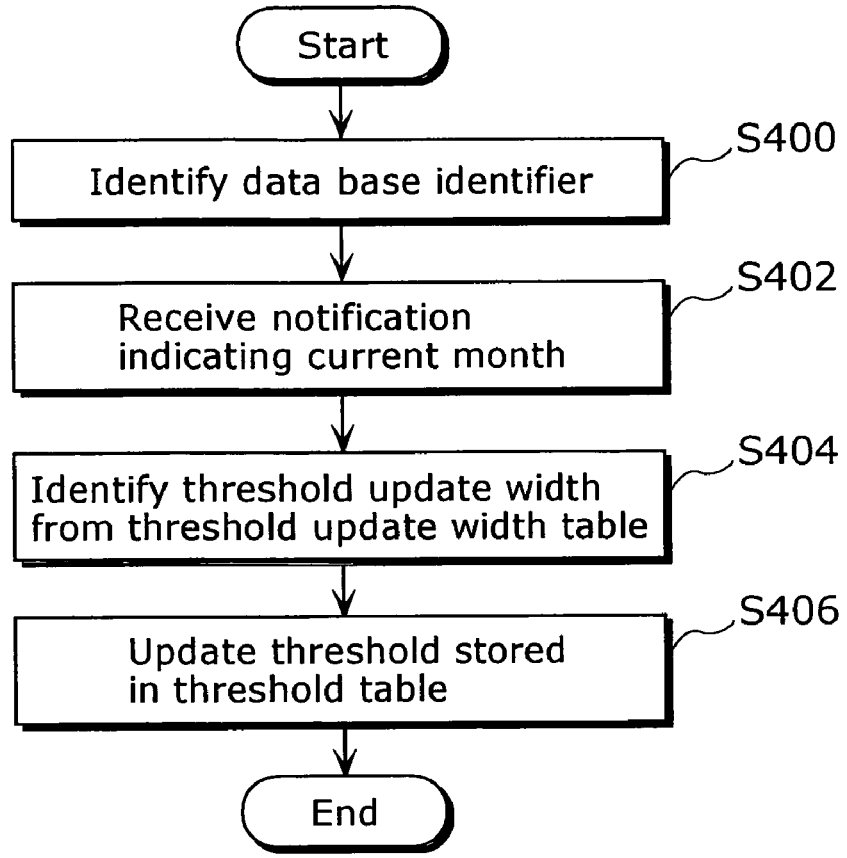
FIG. 27 is a flow chart showing operations of the threshold update unit.
FIG. 28 is a table details display diagram showing details of a keyword table updated by the retrieval keyword update unit.

FIG. 27 is a flow chart showing the operations of the threshold update unit 125b.

The threshold update unit 125b first identifies one of the data base identifiers for respective data bases per information source (step S400). For example, the threshold update unit 125b identifies the data base identifier by acquiring the data base identifier from the retrieval instruction issue unit 102 or retrieving the data base identifier of the data base unit which is not used for a predetermined period.

The threshold update unit 125b which has identified the data base identifier as described above receives a notification indicating the current month from the calendar notification unit 131 (step S402). Then, the threshold update unit 125b identifies, from the threshold update width table 132a, the threshold update width associated with the data base identifier and the month (step S404).

The threshold update unit 125b updates the threshold changing the threshold by the identified threshold update width, the threshold being stored in the threshold table 104a associated with the data base identifier (step S406). For example, when acquiring the data base identifier from the retrieval instruction issue unit 102 in the step S400, the threshold update unit 125b updates the threshold reducing the threshold by the threshold update width. When retrieving the data base identifier of the data base unit which is not used in the step S400, the threshold update unit 125b updates the threshold increasing the threshold by the threshold update width.

As described above, the threshold update unit 125b according to the present embodiment changes the update width of the threshold according to the calendar. Thus, even if the details of information stored in the data base unit chronologically changes, the threshold update unit 125b can properly update the threshold.

For example, in the data base unit which deals with information related to baseball, a lot of information is stored in summer, but little information is stored in winter. As a result, the nonuse period of the data base unit becomes long. However, since the user's preference for baseball does not weaken in winter, it is not proper to increase the threshold of the data base unit simply based on the prolonged nonuse period. Here, as the present embodiment described above, the threshold update width table 132a indicating small threshold update width in winter can be stored into the threshold update width storage unit 132 so that the threshold of the data base unit can be properly updated, the data base dealing with the information related to baseball.

Also, during the New Year's holidays many special TV programs are stored in the data base unit, and such data base unit is often used. In the case where the threshold of the data base unit is reduced according to the use of the data base unit in which many special TV programs are stored, too many keywords may be selected to be used for the data base unit. Here, the threshold update width table 132a indicating small threshold update width during the New Year's holidays can be stored into the threshold update width storage unit 132 so that the threshold of the data base unit can be properly updated, the data base dealing with the special TV programs.

Moreover, the threshold update unit 125b according to the present embodiment changes the threshold update width according to the data base unit. Thus, the threshold update unit 125b can properly update the threshold for each data base unit.

For example, even in the case where the change of the information details stored in the information source A data base 101A is large and the change of the information details stored in the information source B data base 101B is small, the threshold can be updated for each data base unit according to the degree of the change. As a result, the threshold of each data base can be updated to the optimum threshold at the optimum convergence speed.

After acquiring the keyword, the weight of the keyword and the data base identifier from the result analysis unit 112, the retrieval keyword update unit 133 identifies the keyword table associated with the acquired data base identifier (data base unit) from the retrieval keyword storage unit 123.

Also, the retrieval keyword update unit 133 judges whether or not to update the identified keyword table based on the threshold of the threshold table 104a associated with the acquired data base identifier. In other words, the retrieval keyword update unit 133 compares the threshold associated with the acquired data base identifier to the predetermined threshold. When the acquired threshold is smaller than the predetermined threshold, the retrieval update unit 133 judges that the keyword table should be updated. When the acquired threshold is equal to or larger than the predetermined threshold, the retrieval update unit 133 judges that the keyword table should not be updated. In other words, the retrieval keyword update unit 133 judges whether or not to update the keyword table associated with the data base unit according to the use frequency of the data base unit. The retrieval keyword update unit 133 judges that the keyword table for the data base unit having a low use frequency should not be updated. And, the retrieval keyword update unit 133 judges that the keyword table for the data base unit having a higher use frequency should be updated.

For example, after acquiring the keyword "Matsuue Electric", the weight "80" and the data base identifier "information source B data base" from the result analysis unit 112, the retrieval keyword update unit 113 identifies the keyword table 123b associated with the acquired data base identifier "information source B data base" from the retrieval keyword storage unit 123. Then, the retrieval keyword update unit 113 compares the threshold "80" associated with the data base identifier "information source B data base" to the predetermined threshold "50". As a result, since the acquired threshold is larger than the predetermined threshold, the retrieval keyword update unit 133 judges that the keyword table 123b should not be updated. On the other hand, after acquiring the keyword "Matsuue Electric", the weight "80" and the data base identifier "information source A data base" from the result analysis unit 112, the retrieval keyword update unit 113 identifies the keyword table 123a associated with the acquired data base identifier "information source A data base" from the retrieval keyword storage unit 123. Then, the retrieval keyword update unit 113 compares the threshold "10" associated with the data base identifier "information source A data base" to the predetermined threshold "50". As a result, since the acquired threshold is smaller than the predetermined threshold, the retrieval keyword update unit 133 judges that the keyword table 123a should be updated.

After judging that the keyword table should be updated, the retrieval keyword update unit 133 updates the identified keyword table using the acquired keyword and the weight of the keyword, based on the threshold associated with the acquired data base identifier and recorded in the threshold table 104a.

For example, as described above, after acquiring the keyword "Matsuue Electric", the weight "80" and the data base identifier "information source A data base" from the result analysis unit 112, the retrieval keyword update unit 113 identifies the keyword table 123a associated with the acquired data base identifier "information source A data base" from the retrieval keyword storage unit 123. Then, as described above, after judging that the keyword table 123a should be updated, the retrieval keyword update unit 133 divides the weight "80" of the acquired keyword by the threshold "10" associated with the data base identifier "information source A data base" and recorded in the threshold table 104a. Moreover, the retrieval keyword update unit 113 adds the value "8" which is the division result to the weight "90" for the keyword "Matsuue Electric" stored in the keyword table 123a, and updates the weight to "98".

FIG. 28 is a table details display diagram showing the details of the keyword table 123a updated by the retrieval keyword update unit 113.

As shown in FIG. 28, the weight associated with the keyword "Matsuue Electirc" stored in the keyword table 123a is updated from "90" to "98".

Figure 29:
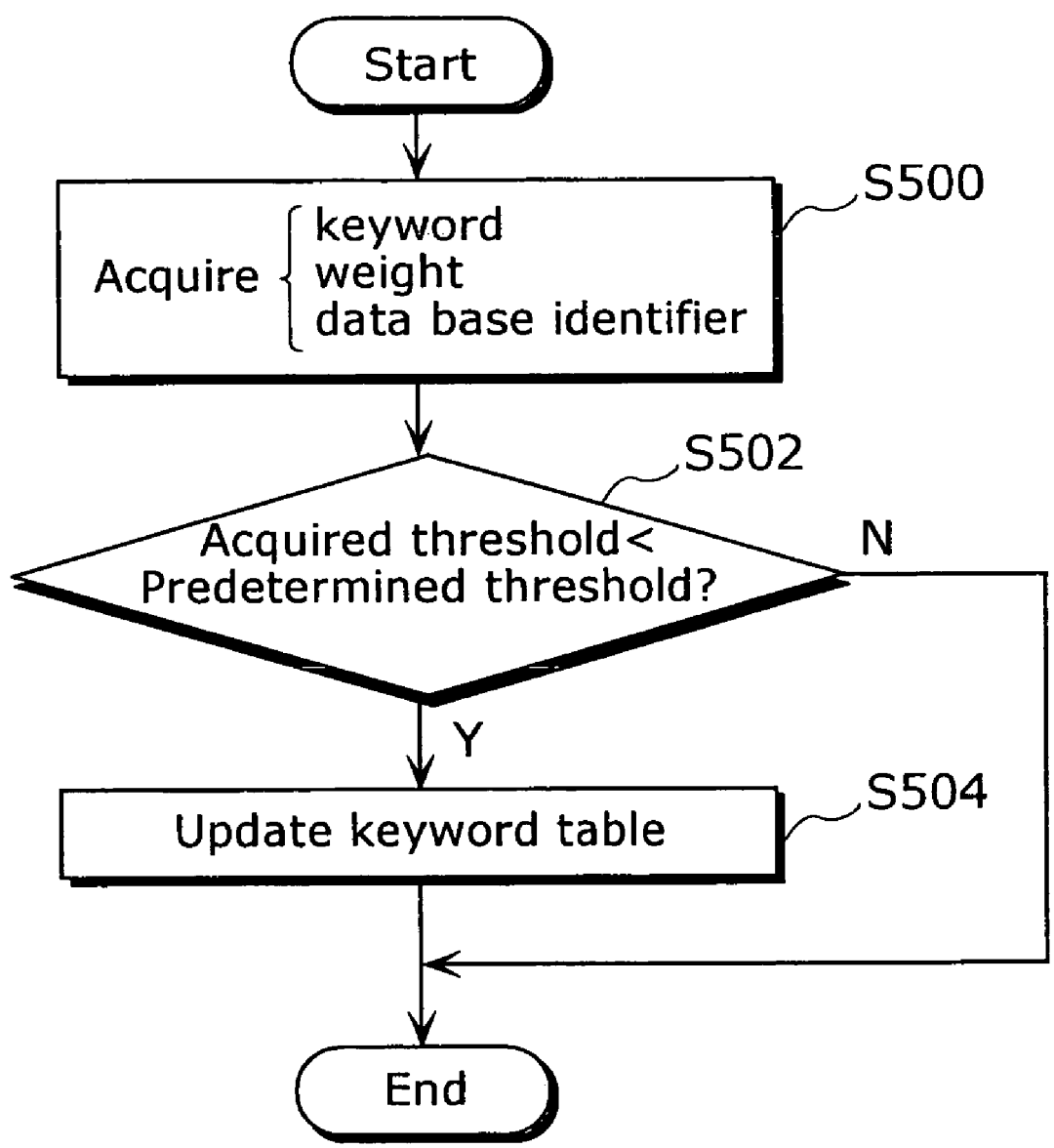
FIG. 29 is a flow chart showing operations of the retrieval keyword update unit.

FIG. 29 is a flow chart showing the operations of the retrieval keyword update unit 133.

The retrieval keyword update unit 133 first acquires the keyword, the weight of the keyword and the data base identifier from the result analysis unit 112 (step S500).

Next, the retrieval keyword update unit 133 judges whether or not the threshold of the threshold table 104a associated with the acquired data base identifier is smaller than the predetermined threshold (step S502).

Here, when judging that the acquired threshold is smaller than the predetermined threshold (Y in S502), the retrieval keyword update unit 133 updates the keyword table associated with the data base identifier acquired in the step S500 (step S504). On the other hand, when judging that the acquired threshold is equal to or larger than the predetermined threshold (N in step S502), the retrieval keyword update unit 133 ends the process.

According to the above mentioned embodiment, the update width of the weight is calculated by the division using the threshold of the data base unit so as to update the weight while reflecting the user's use frequency of the data base unit. However, there are other methods for calculating the update width of the weight.

Also, when the keyword acquired from the result analysis unit 112 is not recorded in the keyword table, the retrieval keyword update unit 113 associates the keyword and the weight, and additionally records the associated keyword and weight into the keyword table.

As described above, when the use frequency of the data base unit is large, the retrieval keyword update unit 133 according to the present embodiment judges that the keyword table associated with the data base unit should be updated. And, when the use frequency of the data base unit is low, the retrieval keyword update unit 133 according to the present embodiment judges that the keyword table associated with the data base unit should not be updated. As a result, learning the user's preference using the data base unit having a low use frequency can be prevented, thus the keyword indicating the user's preference can be properly selected.

(First Variation)

Here, a variation of the method for selecting the keyword by the retrieval keyword selection unit will be explained.

The retrieval keyword selection unit 125a according to the present embodiment selects the keyword from the keyword table associated with the data base identifier acquired from the retrieval instruction issue unit 102.

The retrieval keyword selection unit according to the present variation selects the keyword from the keyword table associated with the data base unit constantly having a high use frequency.

Concretely, after acquiring the data base identifier from the retrieval instruction issue unit 102, the retrieval keyword selection unit according to the present variation compares the threshold stored in the threshold table 104a associated with the data base identifier to the use frequency threshold. In the case where the acquired threshold is smaller than the use frequency threshold, the retrieval keyword selection unit judges that the use frequency of the data base unit indicated by the data base identifier is high. In the case where the acquired threshold is equal to or larger than the use frequency threshold, the retrieval keyword selection unit judges that the use frequency of the data base unit is low.

For example, after acquiring the data base identifier "information source A data base", the retrieval keyword selection unit identifies the threshold "10" associated with the data base identifier from the threshold table 104a. Then, since the threshold "10" is smaller than the use frequency threshold "70", the retrieval keyword selection unit judges that the use frequency of the information source A data base 101A is high. On the other hand, after acquiring the data base identifier "information source B data base", the retrieval keyword selection unit identifies the threshold "80" associated with the data base identifier from the threshold table 104a. Then, since the identified threshold "80" is larger than the use frequency threshold "70", the retrieval keyword selection unit judges that the use frequency of the information source B data base 101B is low.

As described above, when judging that the use frequency of the data base unit associated with the data base identifier acquired from the retrieval instruction issue unit 102 is low, the retrieval keyword selection unit retrieves the data base identifier of the data base unit, for example, having the highest use frequency. In other words, the retrieval keyword selection unit retrieves, from the threshold table 104a, the data base identifier associated with the smallest threshold as the data base identifier of the data base unit having the highest use frequency. As a result of the retrieval, after discovering the data base identifier having the smallest threshold, the retrieval keyword selection unit selects the keyword having the weight which is equal to or larger than the smallest threshold from the keyword table associated with the data base identifier. Then, the retrieval keyword selection unit associates the discovered data base identifier with the selected keyword, and outputs the associated data base identifier and keyword.

For example, the retrieval keyword selection unit discovers, from the threshold table 104a, the data base identifier "information source A data base" associated with the smallest threshold "10" as the data base identifier of the data base unit having the highest use frequency. The retrieval keyword selection unit selects the keyword having the weight whose threshold is equal to or larger than the threshold "10" from the keyword table 123a associated with the data base identifier "information source A data base". Then, the retrieval keyword selection unit associates the discovered data base identifier with the selected keyword such as "information source A data base, (Matsuue Electric, economy, sports . . . entertainment)", and outputs the associated data base identifier and keywords.

As described above, the retrieval keyword selection unit according to the present variation selects the keyword from the keyword table associated with the data base unit constantly having a high use frequency. In other words, each of the keyword tables 123a, 123b and 123c is updated according to the use frequency of the respectively associated data base unit. Thereby, the user's preference is not fully reflected in the keyword table for the data base unit having a low use frequency. Thus, as described above, by selecting the keyword from the keyword table associated with the data base unit constantly having the high use frequency, the keyword fully reflecting the user's preference can be properly selected for the data base unit having a low use frequency.

When judging that the data base unit associated with the data base identifier acquired from the retrieval instruction issue unit 102 has a low use frequency, the retrieval keyword selection unit according to the present variation selects the keyword from the keyword table associated with the data base unit having the highest use frequency. However, the retrieval keyword selection unit may select the keyword from the keyword table associated with another data base unit. In other words, the retrieval keyword selection unit identifies the data details (media type) of the data base unit associated with the data base identifier acquired from the retrieval instruction issue unit 102. Then, the retrieval keyword selection unit selects the keyword from the keyword table associated with the data base unit storing data similar to the data details. For example, when the data details of the data base unit associated with the data base identifier acquired from the retrieval instruction issue unit 102 are audio, the retrieval keyword selection unit selects the keyword from the keyword table associated with the data base unit storing audio data.

(Second Variation)

Here, another variation of the method for selecting the keyword by the retrieval keyword selection unit will be explained.

The retrieval keyword selection unit 125a according to the present embodiment selects the keyword from each of the keyword table 123a, 123b and 123c based on the weight stored in each of the keyword table 123a, 123b and 123c and the threshold stored in the threshold table 104a.

The retrieval keyword selection unit according to the present variation selects the keyword from each of the keyword table 123a, 123b and 123c based on the weight stored in each of the keyword table 123a, 123b and 123c and the selection number stored in the threshold table.

In other words, instead of the threshold, the selection number is associated with each data base identifier, and stored in the threshold table according to the present variation. After acquiring the data base identifier from the retrieval instruction issue unit 102, the retrieval keyword selection unit identifies the keyword table associated with the acquired data base identifier from the retrieval keyword storage unit 123. Then, the retrieval keyword selection unit preferentially selects, from the identified keyword table, one or more keywords having a large weight based on the selection number stored in the threshold table 104a associated with the acquired data base identifier.

(Third Variation)

Here, a variation of the threshold update width table will be explained.

The threshold update width table 132a according to the present embodiment associates each data base identifier with the threshold update width of each month and displays the associated data base identifier and threshold update width.

The threshold update width table 132a according to the present variation displays only the threshold update width of each month.

FIG. 30 is a table details display diagram showing the details of the threshold update width table according to the present variation.

For example, as shown in FIG. 30, the threshold update width table displays the threshold update width "0" of January, the threshold update width "10" of March, the threshold update width "5" of October and the like. The threshold update width of each month displayed by the threshold update width table as described above is applied to update the threshold stored in the threshold table 104a regardless of differentiation between the data bases per information source (data base identifiers).

(Fourth Variation)

Here, another variation of the threshold update width table will be explained.

The threshold update width table 132a according to the present embodiment associates each data base identifier with the threshold update width of each month, and displays the associated data base identifier and threshold update width.

The threshold update width table according to the present variation displays only the update width of each data base unit (data base identifier).

FIG. 31 is a table details display diagram showing the details of the threshold update width table according to the present variation.

For example, as shown in FIG. 31, the threshold update width table displays the threshold update width "5" of the data base identifier "information source A data base", the threshold update width "20" of the data base identifier "information source B data base" and the threshold update width "30" of the data base identifier "information source C data base". The threshold update width of each data base unit displayed in the threshold update width table as described above can be applied to update the threshold stored in the threshold table 104a regardless of the differentiation between the months.

As described above, the present invention has been explained using each embodiment and variation. However, the present invention is not limited to these embodiments and variations.

For example, in each embodiment and variation as described above, the stronger the user's preference is, the larger the weight recorded in the keyword table 103a is, and the weaker the user's preference is, the smaller the weight is. However, this may be vice versa. In this case, the retrieval keyword selection unit selects the keyword whose weight is equal to or smaller than the threshold. Moreover, the threshold update unit updates the threshold by increasing the threshold of the data base each time the data base is used, and by reducing the threshold of the data base when the nonuse period of the data base is prolonged.

Also, according to each embodiment and variation as described above, the EPG is stored in each data base unit. However, as long as the data can be commonly used, each data base unit may accumulate different information details such as song titles of Compact Disc (CD). In addition, the data base unit for storing the EPG and the data base unit for storing the song titles of CD may be combined. In other words, some data bases per information source store the EPG, and other data bases per information source store the song titles of CD. In this case, the retrieval keyword selection unit 125a selects the keyword, for example, from one keyword table. And, the retrieval unit 106 retrieves, using the keyword: TV programs from the data base unit storing the EPG; and song titles from the data base unit storing the CD.

Also, according to each embodiment and variation as described above, the retrieval keyword selection unit selects all the keywords having weights that are equal to or larger than the threshold. However, the retrieval keyword selection unit may select only some of the keywords. For example, the retrieval keyword selection unit selects only the keywords having the middle weights among all of the selectable keywords included in the keyword table, the keywords having weights that are equal to or larger than the threshold. In other words, the retrieval keyword selection unit selects the keywords by excluding the keywords having the largest weight and the keywords having the smallest weight among all of the selectable keywords.

Thus, the problem caused by learning too many keywords can be prevented. For example, the word "world" is often used among the TV program titles. Thus, the keyword "world" is provided with a large weight regardless of the user's preference, and registered into the keyword table. When such keyword "world" is used, the TV programs which the user is not interested in are retrieved. Here, the retrieval keyword selection unit selects only the keywords having the middle weights as described above. Thus, the retrieval keyword selection unit can properly select the keywords associated with the user's preference. As a result, the TV programs suitable for the user can be retrieved.

Also, the keywords stored in the retrieval keyword storage unit according to each embodiment and variation as described above may be genres, categories or concrete names included in these genres or categories.

According to the second and fourth embodiments, in order to update the weight by reflecting the user's use frequency for the data base unit, the update width of the weight is calculated by executing the division using the threshold of the data base unit. However, the update width may not be calculated by such division. In other words, the retrieval keyword update unit determines the update width of the weight for the keyword acquired from the result analysis unit 112 so that the (i) the update width is large in the case where the use frequency of the data base unit to be retrieved is high and (ii) the update width is small in the case where the use frequency of the data base unit to be retrieved is low. As described above, in the case where the update width of the weight is determined according to the use frequency, for example, the retrieval keyword update unit may subtract the weight acquired from the result analysis unit 112 from a predetermined value, and determine the subtraction result (difference) as the update width of the weight. Moreover, the retrieval keyword update unit may not calculate the update width of the weight, but update the weight stored in the keyword table to the weight acquired from the result analysis unit 112.

Furthermore, in the third embodiment and the variation, A information device 380 and B information device 390 are separate devices, and the A server 380a and the B server 390a are separate servers. However, these devices and servers may be respectively structured as the same devices. Also, one information device may execute retrieval on a plurality of data bases connected via network.

In the fourth embodiment and the variation, the retrieval keyword update unit 133 judges whether or not to update the keyword table based on the threshold stored in the threshold table 104a. However, instead of the threshold, based on another parameter which can identify the use frequency of the data base unit, the retrieval keyword update unit 133 may judge whether or nor to update the keyword table. As such another parameter, for example, there are a use number of each data base unit, the number of keywords registered in each keyword table and the like.

Also, in the fourth embodiment and the variation, each data base unit may store data belonging to the assigned category or genre, and each keyword table may store the keywords belonging to the assigned category or genre. For example, the information source A data base 101A stores data belonging to soccer category, and the keyword table 123a stores keywords belonging to the soccer category. In this case, after acquiring the data base identifier from the retrieval instruction issue unit 102, the retrieval keyword selection unit 125a identifies the category for the data base unit indicated by the data base identifier. Then, the retrieval keyword selection unit 125a identifies the keyword table storing the keywords belonging to the identified category from the retrieval keyword storage unit 123.

Also, in the fourth embodiment and the variation, the calendar notification unit 131 notifies the current month to the keyword processing unit 125. However, the current date and time may be notified as the calendar. In this case, the threshold update width table 132a displays the threshold update width for each data base unit, for example, every day or every hour. Also, the threshold update width table 132a displays the threshold update width for each data base unit, for example, every morning, every afternoon and every evening. Then, the threshold update unit 125b identifies, from the threshold update width table 132a, the threshold update width associated with the date and time notified from the calendar notification unit 131.

Also, the features of the fourth embodiment may be applied to the third embodiment and the variation. In other words, in the third embodiment and the variation, instead of the retrieval keyword storage unit 103, the retrieval keyword update unit 113a, the retrieval keyword selection unit 303a and the threshold update unit 303b, the retrieval keyword storage unit 123, the retrieval keyword update unit 133, the retrieval keyword selection unit 125a and the threshold update unit 125b according to the fourth embodiment and the variation may be used. Furthermore, in the third embodiment and the variation, the threshold update width storage unit 132 and the calendar notification unit 131 according to the fourth embodiment and the variation may be used.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be applied to an information retrieval apparatus which can properly retrieve information associated with the user's preference from one of a plurality of data bases having different user's use frequencies. For example, the information retrieval apparatus retrieves TV programs and the like from a plurality of data bases storing respective EPGs of different broadcast configurations.

What is claimed is:

1. An information retrieval apparatus that retrieves information from a plurality of data bases that accumulate different information, the information retrieval apparatus comprising:
    a data base identification unit that identifies one of the plurality of data bases according to a user's operation;
    a selection unit that preferentially selects, from a group of keywords indicating the user's preferences, one or more strongly preferred keywords based on a number associated with a use frequency of the data base identified by said data base identification unit; and
    a retrieval unit that retrieves information including the one or more keywords selected by said selection unit from the data base identified by said data base identification unit,
    wherein said selection unit includes:
    a keyword storage unit that stores, in advance, the group of keywords and a weight value indicating a degree of the user's preference for each of the keywords included in the group of keywords;
    a threshold storage unit that stores thresholds, in advance, each of the thresholds being associated with a use frequency for a corresponding one of the plurality of data bases; and
    a keyword selection unit that reads out the threshold associated with the data base identified by said data base identification unit, and that selects, from the group of keywords stored in said keyword storage unit, one or more keywords having a weight value which is (i) equal to or larger than the read-out threshold or (ii) equal to or smaller than the read-out threshold.

2. The information retrieval apparatus according to claim 1, further comprising:

an information reception unit that receives, according to the user's operation, desired information for the user from among the information retrieved by said retrieval unit;

an analysis unit that extracts a keyword based on the information retrieved by said retrieval unit and the user's desired information received by said information reception unit, and that derives a weight value associated with the extracted keyword; and a write unit that writes the extracted keyword and the weight value derived by said analysis unit into said keyword storage unit.

3. The information retrieval apparatus according to claim 2, wherein said write unit updates the weight value of the extracted keyword stored in said keyword storage unit to the weight value derived by said analysis unit in the case where the extracted keyword is already stored in said keyword storage unit.

4. The information retrieval apparatus according to claim 3, further comprising:

a write judgment unit for judging that judges whether or not the weight value derived by said analysis unit should be written into said keyword storage unit, according to a use frequency of a data base which is the source of the information received by said information reception unit, wherein said write unit writes the extracted keyword and the weight value derived by said analysis unit into said keyword storage unit in the case where said write judgment unit judges that the weight value should be written into said keyword storage unit.

5. The information retrieval apparatus according to claim 4, wherein said write judgment unit reads out a threshold of the data base which is the source of the information received by said information reception unit, and judges that the weight value derived by said analysis should be written into said keyword storage unit in the case where the read-out threshold is smaller or larger than a predetermined value.

6. The information retrieval apparatus according to claim 5, wherein in the case of deriving the weight value associated with the extracted keyword, said analysis unit derives the weight value by using:

the weight value associated with the extracted keyword stored in said keyword storage unit; and the threshold stored in said threshold storage unit in association with the data base which accumulates the information received by said information reception unit.

7. The information retrieval apparatus according to claim 5, wherein in the case of deriving the weight value associated with the extracted keyword, said analysis unit derives the weight value by using:

a weight value directly analyzed, regardless of information stored in said keyword storage unit, based on the information retrieved by said retrieval unit and the user's desired information received by said information reception unit; and the threshold stored in said threshold storage unit in association with the data base which accumulates the user's desired information received by said information reception unit.

8. The information retrieval apparatus according to claim 5, wherein in the case of deriving the weight value associated with the extracted keyword, said analysis unit derives the weight value by using:

the weight value associated with the extracted keyword stored in said keyword storage unit; and a weight value directly analyzed, regardless of information stored in said keyword storage unit, based on the information retrieved by said retrieval unit and the user's desired information received by said information reception unit.

9. The information retrieval apparatus according to claim 3, further comprising:

a threshold update unit that updates the threshold of the data base which has been used for retrieval among the thresholds stored in said threshold storage unit in the case where one of the plurality of data bases has been used for retrieval.

10. The information retrieval apparatus according to claim 9, further comprising:

a period threshold update unit that updates the thresholds, each of the thresholds being stored in said threshold storage unit in association with a corresponding one of the plurality of data bases, according to an elapsed period for which the plurality of data bases have not been used for retrieval.

11. The information retrieval apparatus according to claim 10, further comprising:

an update width storage unit that stores an update width of a threshold for each of a plurality of calendar attributes, wherein in the case where one of the plurality of data bases has been used for retrieval, said threshold update unit identifies an update width associated with a current calendar attribute in said update width storage unit, and updates the threshold of the data base which has been used for the retrieval by the identified update width, and wherein in the case where one of the plurality of data bases has not been used and a predetermined period has elapsed, said period threshold update unit identifies an update width associated with the current calendar attribute from said update width storage unit, and updates, by the identified update width, the threshold of the data base which has not been used for the retrieval.

12. The information retrieval apparatus according to claim 10, further comprising an update width storage unit that stores an update width of each of the thresholds, each of the thresholds corresponding to one of the plurality of data bases, wherein in the case where one of the plurality of data bases has been used for retrieval, said threshold update unit identifies, from said update width storage unit, an update width associated with the data base that has been used for the retrieval, and updates a threshold of the data base by the identified update width, and wherein in the case where one of the plurality of data bases has not been used for retrieval, and a predetermined period has elapsed, said period threshold update unit identifies an update width associated with the data base that has not been used for the retrieval, and updates the threshold of the data base by the identified update width.

13. The information retrieval apparatus according to claim 10, further comprising an update width storage unit that stores an update width of each of the thresholds, each of the thresholds corresponding to one of a plurality of calendar attributes and one of the plurality of data bases, wherein in the case where one of the plurality of data bases has been used for retrieval, said threshold update unit identifies, from said update width storage unit, an update width associated with a current calendar attribute and the data base that has been used for the retrieval, and updates the threshold of the data base by the identified update width, and wherein in the case where one of the plurality of data bases has not been used for retrieval, and a predetermined period has elapsed, said period threshold update unit identifies an update width associated with the data base that has not been used for the retrieval, and updates the threshold of the data base by the identified update width.

14. The information retrieval apparatus according to claim 3, further comprising:
   a reception unit that receives an identification of a data base desired by the user and a threshold associated with the desired data base according to the user's operation; and
   a threshold manual update unit for updating that updates, to the threshold received by said reception unit, the threshold associated with the user's desired data base.

15. The information retrieval apparatus according to claim 1, wherein the group of keywords is one group of a plurality of groups of keywords,
   wherein each of the plurality of data bases is associated with a different one of the plurality of groups of keywords, and
   wherein said selection unit selects one or more keywords from a group of keywords associated with the data base identified by said data base identification unit among the plurality of groups of keywords respectively associated with each of the data bases.

16. The information retrieval apparatus according to claim 1, wherein the group of keywords is one group of a plurality of groups of keywords,
   wherein each of the plurality of data bases is associated with a different one of the plurality of groups of keywords, and
   wherein said selection unit selects one or more keywords from a group of keywords associated with a data base having a higher use frequency than the data base identified by said data base identification unit among the plurality of groups of keywords respectively associated with each of the data bases.

17. The information retrieval apparatus according to claim 16, wherein in the case where the use frequency of the data base identified by said data base identification unit is equal to or higher than a predetermined number, said selection unit selects one or more keywords from a group of keywords associated with the data base identified by said data base identification unit, and
   wherein in the case where the use frequency is lower than the predetermined number, said selection unit selects one or more keywords from a group of keywords associated with another data base whose use frequency is higher than the use frequency of the data base identified by said data base identification unit.

18. The information retrieval apparatus according to claim 1, wherein said selection unit selects one or more keywords from the group of keywords, regardless of the data base identified by said data base identification unit.

19. An information retrieval support apparatus which supports, via a network, information retrieval of a retrieval device that retrieves information from a plurality of data bases that accumulate different information, the information retrieval support apparatus comprising:
   a data base identification unit that identifies one of the plurality of data bases according to a user's operation;
   a selection unit that preferentially selects, from a group of keywords indicating the user's preferences, one or more strongly preferred keywords based on a number associated with a use frequency of the data base identified by said data base identification unit; and
   a notification execution unit that notifies the retrieval device of the one or more keywords selected by said selection unit, and for causing that causes the retrieval device to execute retrieval of information including the one or more keywords selected from the identified data base,
   wherein said selection unit includes:
      a keyword storage unit that stores, in advance, the group of keywords and a weight value indicating a degree of the user's preference for each of the keywords included in the group of keywords;
      a threshold storage unit that stores thresholds, in advance, each of the thresholds being associated with a use frequency for a corresponding one of the plurality of data bases; and a keyword selection unit that reads out the threshold associated with the data base identified by said data base identification unit, and that selects, from the group of keywords stored in said keyword storage unit, one or more keywords having a weight value which is (i) equal to or larger than the read-out threshold or (ii) equal to or smaller than the read-out threshold.

20. The information retrieval support apparatus according to claim 19, further comprising:
   an acquisition write unit that acquires a keyword and a weight value transmitted via the network from the retrieval device, and that writes the acquired keyword and the acquired weight value into said keyword storage unit.

21. The information retrieval support apparatus according to claim 20, further comprising:
   an information reception unit that receives desired information for the user from among the information retrieved by the retrieval device;
   an analysis unit that extracts a keyword based on the information retrieved by said retrieval unit and the user's desired information received by said information reception unit, and that derives a weight value associated with the extracted keyword; and
   a write unit that writes the extracted keyword and the weight value derived by said analysis unit into said keyword storage unit.

22. The information retrieval support apparatus according to claim 21,
   wherein said write unit updates the weight value of the extracted keyword stored in said keyword storage unit to the weight value derived by said analysis unit in the case where the extracted keyword is already stored in said keyword storage unit.

23. The information retrieval support apparatus according to claim 22, wherein in the case of deriving the weight value associated with the extracted keyword, said analysis unit derives the weight value by using:
   the weight value associated with the extracted keyword stored in said keyword storage unit; and
   the threshold stored in said threshold storage unit in association with the data base which accumulates the information received by said information reception unit.

24. The information retrieval support apparatus according to claim 22, wherein in the case of deriving the weight value associated with the extracted keyword, said analysis unit derives the weight value by using:
   a weight value directly analyzed, regardless of information stored in said keyword storage unit, based on the information retrieved by said retrieval unit and the user's desired information received by said information reception unit; and
   the threshold stored in said threshold storage unit in association with the data base which accumulates the user's desired information received by said information reception unit.

25. The information retrieval support apparatus according to claim 22, wherein in the case of deriving the weight value associated with the keyword, said analysis unit derives the weight value by using:

the weight value associated with the extracted keyword stored in said keyword storage unit; and a weight value directly analyzed, regardless of information stored in said keyword storage unit, based on the information retrieved by said retrieval unit and the user's desired information received by said information reception unit.

26. The information retrieval apparatus according to claim 22, further comprising a threshold update unit that updates the threshold of the data base which has been used for retrieval among each of the thresholds stored in said threshold storage unit in the case where one of the plurality of data bases has been used for retrieval.

27. The information retrieval support apparatus according to claim 26, further comprising a period threshold update unit that updates each of the thresholds stored in said threshold storage unit in association with a corresponding one of the data bases, according to an elapsed period for which the plurality of data bases have not been used for retrieval.

28. The information retrieval support apparatus according to claim 22, further comprising:

a reception unit that receives an identification of a data base desired by the user and a threshold associated with the user's desired database according to the user's operation; and a threshold manual update unit that updates, to the threshold received by said reception unit, the threshold associated with the user's desired data base.

29. The information retrieval support apparatus according to claim 22, further comprising:

an acquisition unit that acquires identification information identifying one of the plurality of data bases and a threshold of the data base identified by the identification information via the network from the retrieval device; and a threshold remote update unit that updates, to the threshold acquired by said acquisition unit, the threshold of the data base identified by the identification information acquired by said acquisition unit among each of the thresholds stored in said threshold storage unit.

30. The information retrieval support apparatus according to claim 22, further comprising a display unit that acquires the information retrieved by the retrieval device via the network, and that displays the acquired information.

31. The information retrieval support apparatus according to claim 22, wherein said data base identification unit identifies one of the plurality of data bases according to data transmitted via the network from the retrieval device.

32. The information retrieval support apparatus according to claim 22, wherein said data base identification unit identifies one of the plurality of data bases according to the user's operation.

33. An information retrieval system comprising:

a retrieval device that retrieves information from a plurality of data bases that accumulate different information details; and an information retrieval support apparatus that supports, via a network, information retrieval of said retrieval device information retrieval, wherein said information retrieval support apparatus includes:

a data base identification unit that identifies one of the plurality of data bases;

a selection unit that preferentially selects, from a group of keywords indicating the user's preferences, one or more strongly preferred keywords based on a number associated with a use frequency of the data base identified by said data base identification unit; and a notification unit that notifies said retrieval device of the one or more keywords selected by said selection unit, wherein said retrieval device executes retrieval of information including the one or more keywords notified by said notification unit from the data base identified by said data base identification unit, and wherein said selection unit includes:

a keyword storage unit that stores, in advance, the group of keywords and a weight value indicating a degree of the user's preference for each keyword included in the group of keywords;

a threshold storage unit that stores thresholds, in advance, each of the thresholds being associated with a use frequency for a corresponding one of the plurality of data bases; and a keyword selection unit that reads out the threshold associated with the data base identified by said data base identification unit, and for that selects, from the group of keywords stored in said keyword storage unit, one or more keywords having a weight value which is (i) equal to or larger than the read-out threshold or (ii) equal to or smaller than the read-out threshold.

34. An information retrieval method for retrieving information from a plurality of data bases that accumulate different information, the method comprising:

identifying one of the plurality of data bases according to a user's operation;

preferentially selecting, from a group of keywords indicating the user's preferences, one or more strongly preferred keywords based on a number associated with a use frequency of the data base identified in said data base identifying; and retrieving information including the one or more keywords selected in said selecting from the data base identified in said data base identifying, wherein in said selecting, a threshold associated with the identified data base is read out from a threshold storage unit that stores, in advance, a plurality of thresholds, each of the thresholds being associated with a use frequency for a corresponding one of the plurality of data bases, and wherein in said selecting, one or more keywords are selected, the one or more keywords having a weight value which is (i) equal to or larger than the read-out threshold or (ii) equal to or smaller than the read-out threshold, from a keyword storage unit that stores, in advance, the group of keywords and a weight value indicating a degree of the user's preference for each of the keywords.

35. The information retrieval method according to claim 34, further comprising:
- receiving desired information for the user from among the information retrieved in said retrieving;
- extracting a keyword based on the information retrieved in said retrieving and the user's desired information received in said information receiving, and deriving a weight value associated with the extracted keyword; and
- writing the extracted keyword and the derived weight value derived into said keyword storage unit.

36. The information retrieval apparatus according to claim 1,
- wherein each of the thresholds associated with the use frequency for each of the plurality of data bases is a value set depending on the user's use frequency for each of the plurality of data bases.

* * * * *